(12) United States Patent
Horii et al.

(10) Patent No.: US 7,980,712 B2
(45) Date of Patent: Jul. 19, 2011

(54) LIGHT-TRANSMISSIVE FILM, METHOD FOR MANUFACTURING THE SAME, AND DISPLAY APPARATUS

(75) Inventors: Akihiro Horii, Miyagi (JP); Kei Obata, Miyagi (JP); Mitsunari Hoshi, Miyagi (JP); Noriyuki Hirai, Miyagi (JP); Hiroshi Mizuno, Miyagi (JP)

(73) Assignee: Sony Corporation, Tokyo (JP)

( * ) Notice: Subject to any disclaimer, the term of this patent is extended or adjusted under 35 U.S.C. 154(b) by 560 days.

(21) Appl. No.: 12/052,126

(22) Filed: Mar. 20, 2008

(65) Prior Publication Data
US 2008/0232113 A1     Sep. 25, 2008

(30) Foreign Application Priority Data

Mar. 22, 2007   (JP) ................................. 2007-075211

(51) Int. Cl.
*F21V 9/14* (2006.01)
*F21V 5/02* (2006.01)

(52) U.S. Cl. ......... 362/19; 362/97.1; 362/97.4; 362/333

(58) Field of Classification Search .................... 362/19, 362/97.1–97.4, 326, 330, 332, 333, 339; 359/487, 488, 494, 496; 428/156, 167, 172
See application file for complete search history.

(56) References Cited

U.S. PATENT DOCUMENTS

| | | |
|---|---|---|
| 2004/0142150 A1 | 7/2004 | Bharadwaj et al. |
| 2006/0138702 A1 | 6/2006 | Biernath |
| 2006/0141218 A1 | 6/2006 | Biernath |
| 2006/0141220 A1 | 6/2006 | Biernath et al. |
| 2006/0204720 A1 | 9/2006 | Biernath |
| 2006/0274244 A1 | 12/2006 | Battiato |
| 2007/0065636 A1 | 3/2007 | Merrill et al. |
| 2007/0236939 A1* | 10/2007 | Ouderkirk et al. ............ 362/339 |
| 2009/0033835 A1* | 2/2009 | Fukagawa et al. ............ 349/96 |

FOREIGN PATENT DOCUMENTS

| | | |
|---|---|---|
| JP | 3158555 | 7/1991 |
| JP | 3158555 | 2/2001 |
| JP | 2001-124909 | 5/2001 |
| JP | 2001-524225 | 11/2001 |
| JP | 2006-513450 | 4/2006 |
| JP | 2006-318668 | 11/2006 |
| JP | 2007-034116 | 2/2007 |
| JP | 2008-525849 | 7/2008 |
| JP | 2009-503618 | 1/2009 |
| WO | 9850806 | 11/1998 |
| WO | 2006/071616 | 7/2006 |
| WO | 2007/019136 | 2/2007 |

OTHER PUBLICATIONS

Japanese Office Action issued on Feb. 10, 2009, for corresponding Japanese Patent Application JP 2007-075211.

* cited by examiner

*Primary Examiner* — Thomas M Sember
(74) *Attorney, Agent, or Firm* — K&L Gates LLP

(57) ABSTRACT

A light-transmissive film for use in display devices is provided. The light-transmissive film includes a plurality of first protrusions formed on one surface and extending in a predetermined direction of the one surface, and a plurality of second protrusions formed on an opposite surface to the one surface, extending in one direction of the opposite surface, arranged parallel to the one direction, and arranged parallel to a direction intersecting the one direction. At least one of the first and second protrusions has a refractive index anisotropy in a plane.

20 Claims, 14 Drawing Sheets

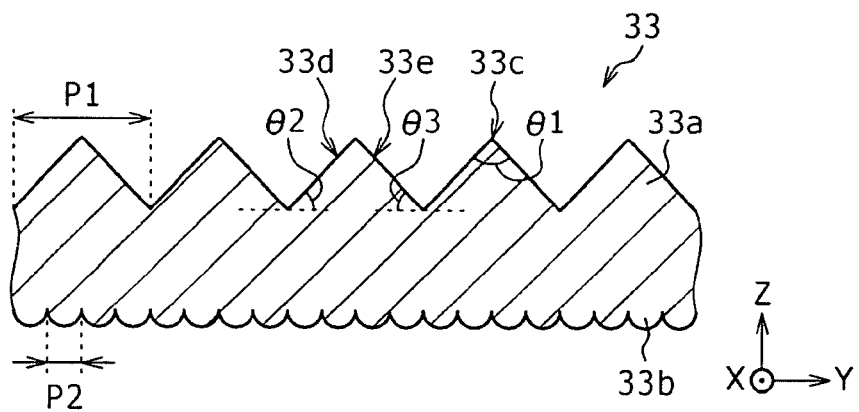
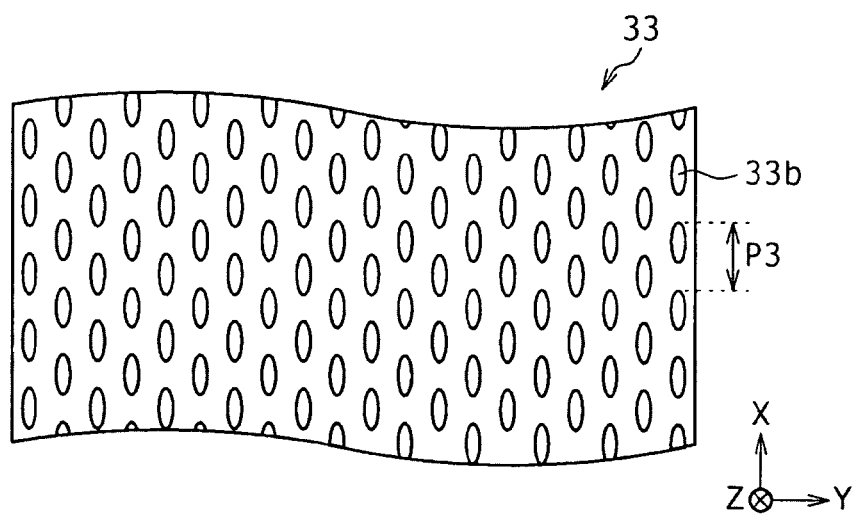
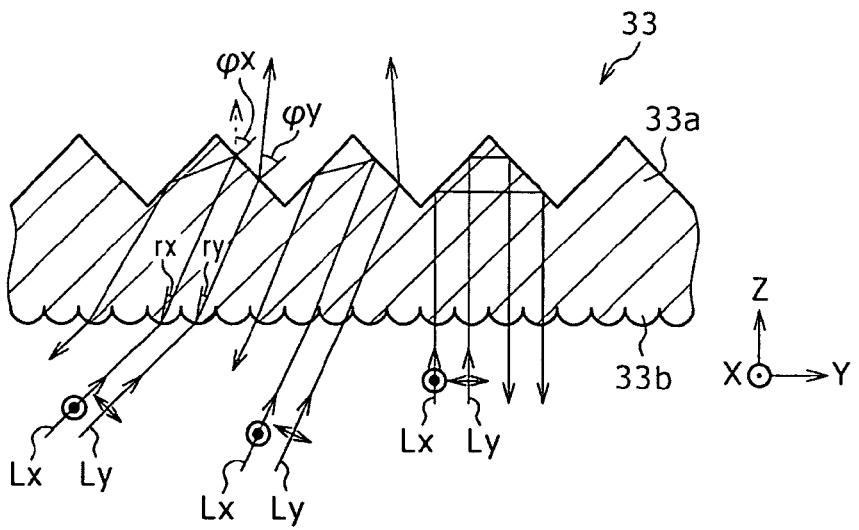

STRETCHING DIRECTION

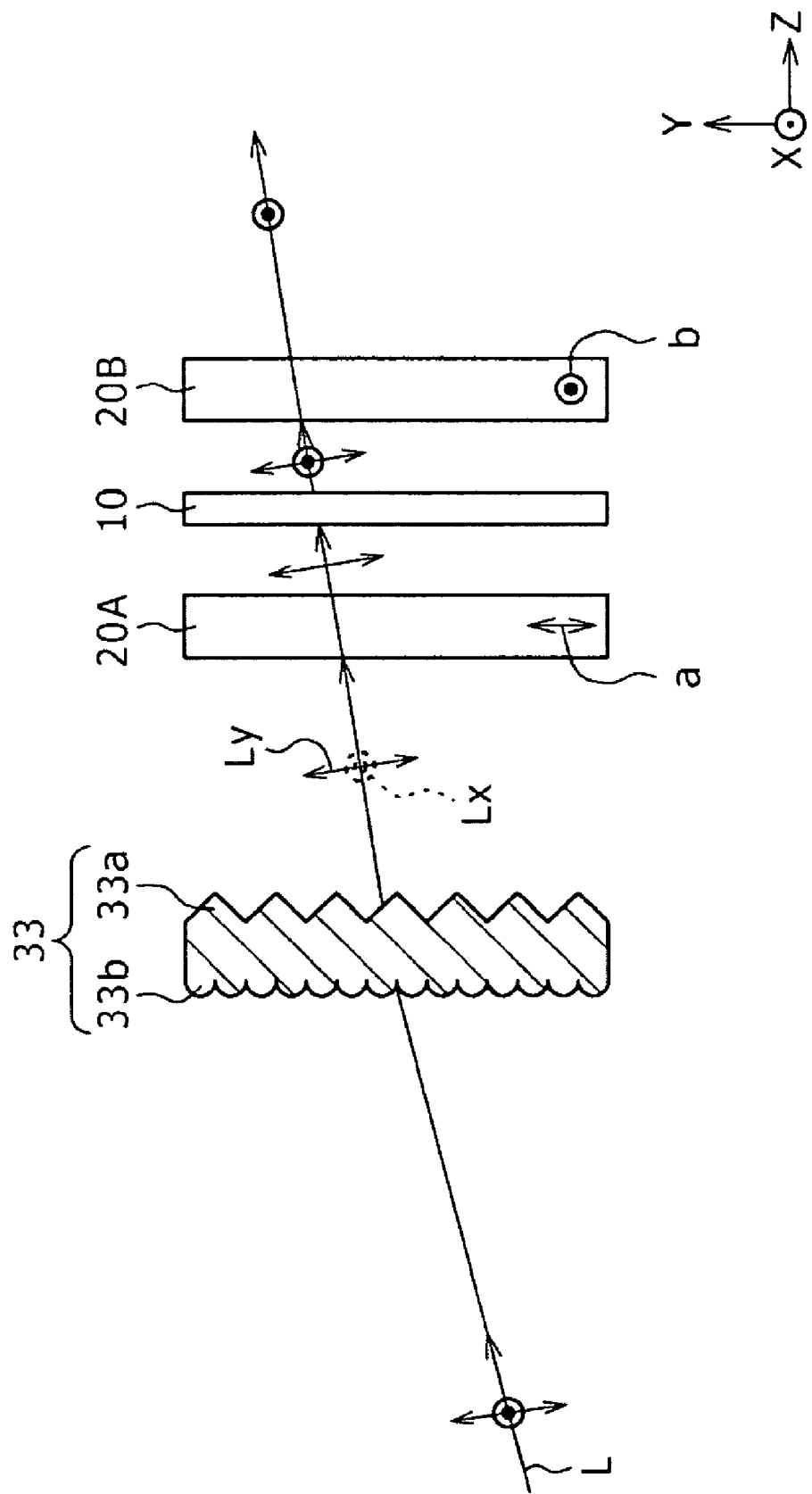

FIG.11A
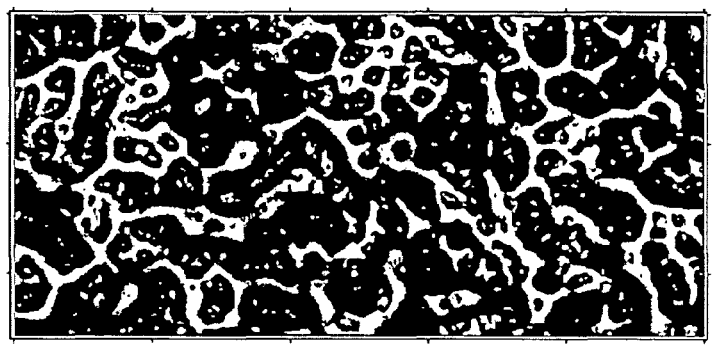
FIG.11B
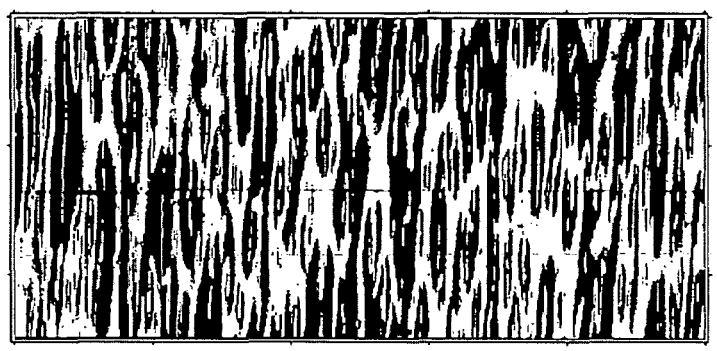
FIG.12
|  | SRz (μm) | SRa (μm) | N-POLARIZED LIGHT (%) | A-POLARIZED LIGHT (%) | B-POLARIZED LIGHT (%) | POLARIZATION AXIS DIFFERENCE (%) |
|---|---|---|---|---|---|---|
| EXAMPLE (AFTER DRAWING) | 8.14 | 1.15 | 40.4 | 35.9 | 51.0 | 15.1 |
| COMPARATIVE EXAMPLE 2 (BEFORE DRAWING) | 12.89 | 1.67 | 56.6 | 58.6 | 58.8 | 0.2 |

| | MAXIMUM BRIGHTNESS (OVER COMPARATIVE EXAMPLE 1) | ILLUMINANCE (OVER COMPARATIVE EXAMPLE 1) | CUT-OFF LEVEL | LEVEL OF NON-UNIFORMITY DUE TO INTERFERENCE |
|---|---|---|---|---|
| EXAMPLE | 105% | 117% | OK | OK |
| COMPARATIVE EXAMPLE 1 | 100% | 100% | NG | NG |
| COMPARATIVE EXAMPLE 2 | 114% | 120% | NG | NG |
| COMPARATIVE EXAMPLE 3 | 86% | 100% | OK | OK |

|  | HORIZONTAL VIEWING ANGLE (DEGREES) (Y-AXIS DIRECTION) | VERTICAL VIEWING ANGLE (DEGREES) (X-AXIS DIRECTION) |
|---|---|---|
| EXAMPLE | 99 | 73 |
| COMPARATIVE EXAMPLE 1 | 94 | 64 |
| COMPARATIVE EXAMPLE 2 | 83 | 45 |

LIGHT-TRANSMISSIVE FILM, METHOD FOR MANUFACTURING THE SAME, AND DISPLAY APPARATUS

CROSS-REFERENCE TO RELATED APPLICATIONS

The present application claims priority to Japanese patent Application No. 2007-75211 filed in the Japanese Patent Office on Mar. 22, 2007, the entire disclosure of which is incorporated herein by reference.

BACKGROUND

The present application relates to a light-transmissive film having a cubic structure on each of front and back surfaces thereof, a manufacturing method therefor, and a display apparatus incorporating the light-transmissive film therein.

In recent years, liquid crystal display apparatuses are replacing CRTs (Cathode Ray Tubes) which have been the predominant display apparatuses owing to their advantages such as low power consumption and space-saving design, increasingly lower prices, and the like.

The liquid crystal display apparatuses are classified, by, e.g., illumination methods for displaying images, into several types, a typical one of which is a transmissive-type liquid crystal display apparatus that displays images by utilizing a light source arranged behind a liquid crystal panel.

In such a display apparatus, it is very important to increase display luminance with decreasing power consumption in enhancing the product value. Accordingly, it has been strongly desired to increase a gain of an optical system arranged between the liquid crystal panel and the light source, while minimizing the power consumption of the light source.

For example, in Japanese Patent No. 3158555 (Patent Document 1), a technology is disclosed in which a light-transmissive film called a brightness enhancement film is arranged between a liquid crystal panel and a light source. In this light-transmissive film, e.g., right-angled isosceles triangular prisms each having a vertical angle of 90 degrees are arranged parallel to a surface (front surface) on a light emergent side, whereas a surface (back surface) on a light incident side is flat.

However, in the light-transmissive film described in Patent Document 1, when the light-transmissive film flexes due to the influence of heat or the like, the back surface may in some cases be stuck to a member (e.g., an optical film disposed between the light-transmissive film and the light source) disposed on a back surface side. When the back surface is stuck to the other member in this way, optical phenomena called "Newton's rings" and "wet-out" occur. Furthermore, when right-angled isosceles triangular prisms each having a vertical angle of 90 degrees are arranged, light is converged greatly toward the front, thereby causing the abrupt reduction in the viewing-angle dependence of the brightness called dark band, cut-off, and the like.

Thus, in order to decrease such phenomena (non-uniformity due to interference), as disclosed in Published Translation of International Patent Application No. 2001-524225, a technique is considered in which protrusions are disposed on the back surface to decrease an area of contact with another member. However, when the protrusions are disposed on the back surface simply, light component available for convergence by the prisms decreases compared with when the back surface is flat, thereby reducing the front luminance.

Furthermore, in order to ease the abrupt reduction of the viewing angle dependence of brightness, a technique is considered in which protrusions are disposed on the back surface similarly to the above or in which the vertex of each prism formed on the front surface is curved. However, in this technique, light component available for convergence by the prisms decreases compared with when the back surface is flat, thereby reducing the front luminance. In addition, when the vertices are curved, the convergence effect by the prisms themselves is lost, thereby reducing the front luminance.

SUMMARY

It is desirable to provide a light-transmissive film capable of decreasing the non-uniformity due to interference and the abrupt reduction in the viewing angle dependence of brightness without reducing the front luminance, and a method for forming thereof, as well as a display apparatus having the light-transmissive film.

In accordance with an embodiment, there is provided a light-transmissive film which includes a plurality of first protrusions formed on one surface and extending in a predetermined direction of the one surface, and a plurality of second protrusions formed on an opposite surface to the one surface, extending in one direction of the opposite surface, arranged parallel to the one direction, and arranged parallel to a direction intersecting the one direction. At least one, or both, of the first protrusions and the second protrusions have refractive index anisotropy in a plane.

In accordance with another embodiment, there is provided a display apparatus which includes a panel driven in response to an image signal, a pair of polarizers sandwiching the panel therebetween, a light source for illuminating the panel, and a light-transmissive film disposed between the polarizers and the light source.

In the light-transmissive film and the display apparatus according to an embodiment, the protrusions are disposed on both surfaces of the light-transmissive film, thereby decreasing an area of contact with other members when the light-transmissive film is incorporated in the display apparatus or the like. Furthermore, the protrusions disposed on each of both surfaces have shape anisotropy, and the protrusions disposed on at least one of both surfaces have refractive index anisotropy, thereby increasing the light utilization efficiency, and thereby enhancing the front luminance.

In accordance with a still another embodiment, there is provided a first method for manufacturing a light-transmissive film, which includes the following steps (A1) and (A2) of:

(A1) forming a plurality of first protrusions on one surface of a resin film, the first protrusions extending in a predetermined direction of the one surface, and forming a plurality of second protrusions on an opposite surface to the one surface of the resin film, the second protrusions arranged parallel to one direction in the opposite surface and arranged parallel to a direction intersecting the one direction; and (A2) stretching the first protrusions and the second protrusions in the predetermined direction to impart refractive index anisotropy to at least one, or both, of the first protrusions and the second protrusions.

In accordance with a still another embodiment, there is provided a second method for manufacturing a light-transmissive film, which includes the following steps (B1) and (B2) of:

(B1) forming a plurality of first protrusions on one surface of a resin film, the first protrusions extending in a predetermined direction of the one surface, and then stretching the first protrusions to impart refractive index anisotropy to the first protrusions; and (B2) forming a plurality of second protrusions on an opposite surface to the one surface of the resin film after the stretching, the second protrusions arranged parallel to one direction of the opposite surface and arranged parallel to a direction intersecting the one direction.

In accordance with a still another embodiment, there is provided a third method for manufacturing a light-transmissive film, which includes the following steps (C1) and (C2) of:

(C1) forming a plurality of second protrusions on one surface of a resin film, the second protrusions arranged parallel to one direction of the one surface and arranged parallel to a direction intersecting the one direction, and then stretching the second protrusions to impart refractive index anisotropy to the second protrusions; and (C2) forming a plurality of first protrusions on an opposite surface to the one surface of the resin film after the stretching, the first protrusions extending in a predetermined direction of the opposite surface.

In accordance with a still another embodiment, there is provided a fourth method for manufacturing a light-transmissive film, which includes the following steps (D1) to (D3) of:

(D1) forming a plurality of first protrusions on one surface of a first resin film, the first protrusions extending in a predetermined direction of the one surface, and then stretching the first protrusions to impart refractive index anisotropy to the first protrusions;

(D2) forming a plurality of second protrusions on one surface of a second resin film, the second protrusions arranged parallel to one direction of the one surface of the second resin film and arranged parallel to a direction intersecting the one direction, and then stretching the second protrusions to impart refractive index anisotropy to the second protrusions; and (D3) bonding an opposite surface to the one surface of the first resin film after the stretching and an opposite surface to the one surface of the second resin film after the stretching, to each other.

In the above manufacturing methods for a light-transmissive film according to an embodiment, the protrusions are disposed on both surfaces of the light-transmissive film, thereby decreasing an area of contact with other members when the light-transmissive film formed by any of the methods is incorporated in a display apparatus or the like. Furthermore, the protrusions disposed on each of both surfaces have shape anisotropy, and the protrusions disposed on at least one of both surfaces have refractive index anisotropy, thereby increasing the light utilization efficiency, and thereby enhancing the front luminance.

The light-transmissive film and display apparatus according to an embodiment, the second protrusions are disposed on the light-transmissive film, thereby making it possible to decrease the non-uniformity due to interference attributable to contact with other members when the light-transmissive film is incorporated in the display apparatus. Furthermore, the protrusions disposed on both surfaces of the light-transmissive film are imparted shape anisotropy, and the protrusions disposed on at least one of both surfaces are imparted refractive index anisotropy, thereby enhancing the front luminance. Furthermore, the abrupt reduction in the viewing angle dependence of brightness can be decreased by the diffusion effect of the second protrusions.

In the method of manufacturing a light-transmissive film according to an embodiment, the second protrusions are disposed on the light-transmissive film, thereby making it possible to decrease the non-uniformity due to interference attributable to contact with other members when the light-transmissive film is incorporated in a display apparatus. Furthermore, the protrusions disposed on both surfaces of the light-transmissive film are imparted shape anisotropy, and the protrusions disposed on at least one of both surfaces are imparted refractive index anisotropy, thereby enhancing the front luminance. Furthermore, the abrupt reduction in the viewing angle dependence of brightness can be decreased by the diffusion effect of the second protrusions.

Additional features and advantages are described herein, and will be apparent from the following Detailed Description and the figures.

BRIEF DESCRIPTION OF THE FIGURES

FIGS. 2A and 2B are a sectional view and a back view representing a configuration example of a brightness enhancement film of FIG. 1;

FIG. 3 is a diagram representing transmission characteristics of the brightness enhancement film of FIG. 1;

FIG. 10 is a schematic configuration diagram for illustrating an operation of the display apparatus of FIG. 1;

FIGS. 11A and 11B are plan views for illustrating shapes of back surfaces before and after stretching, of a brightness enhancement film according to an embodiment;

FIG. 12 is a comparative diagram for illustrating anisotropies of haze according to examples and comparative examples;

DETAILED DESCRIPTION

An embodiment of the present application will now be described in detail with reference to the drawings.

Figure 1:
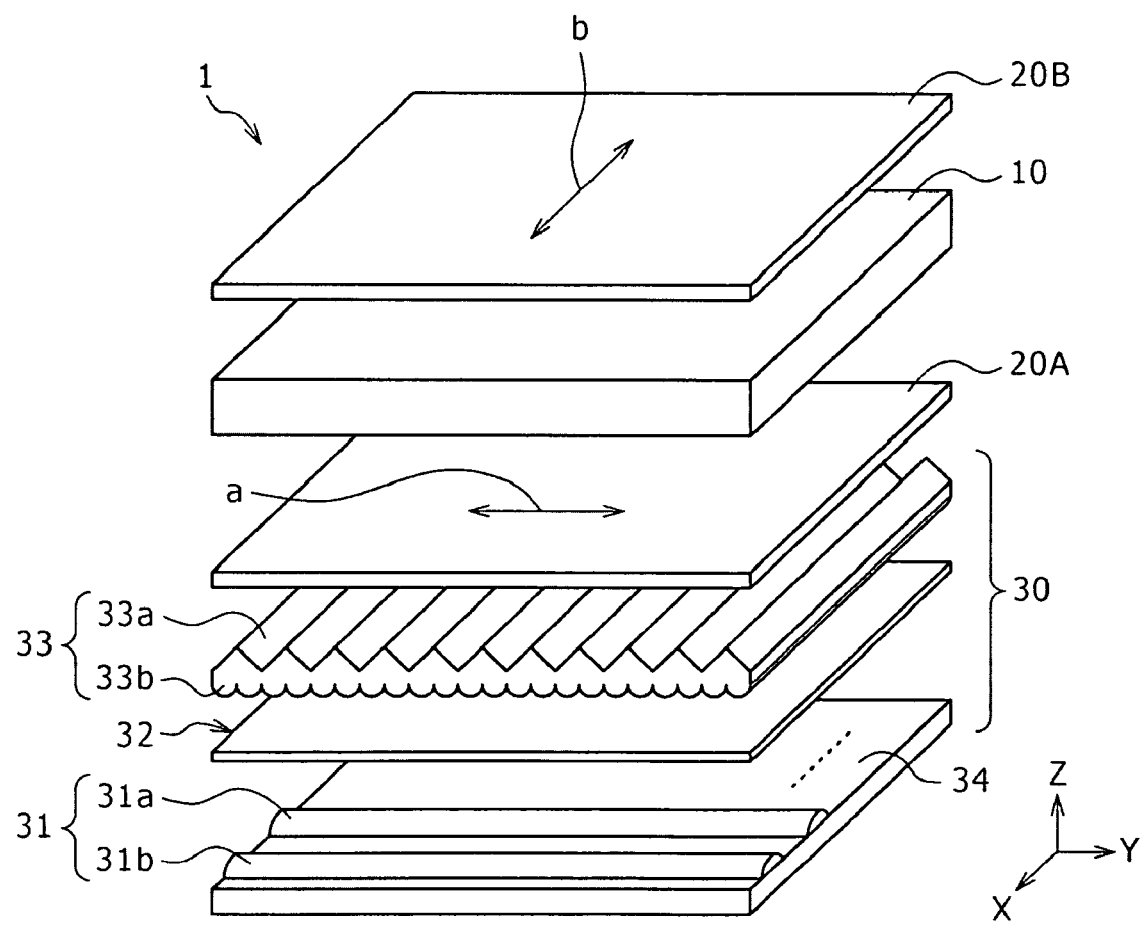
FIG. 1 is a perspective view representing a configuration example of a display apparatus according to an embodiment, in an exploded form.

FIG. 1 represents a schematic configuration of a display apparatus 1 according to an embodiment. This display apparatus 1 includes a liquid crystal display panel 10, a first polarizer 20A and a second polarizer 20B sandwiching the liquid crystal display panel 10 therebetween, an illuminating device 30 disposed behind the first polarizer 20A, and a driving circuit (not shown) for displaying video by driving the liquid crystal display panel 10. A front surface of the second polarizer 20B is oriented toward a viewer (not shown).

The liquid crystal display panel 10 is, e.g., a transmissive-type display panel in which pixels is driven responsive to video signals, and is configured such that a pair of transparent plates sandwich a liquid crystal layer therebetween. Specifically, the liquid crystal display panel 10 has, in the following order from the viewer, a transparent plate, a color filter, a transparent electrode, an alignment layer, the liquid crystal layer, an alignment layer, transparent pixel electrodes, and a transparent plate.

Each transparent plate as used herein is typically a plate transparent to visible light. It is noted that an active type driving circuit is formed on the transparent plate on an illuminating device 30 side. The active-type driving circuit includes TFTs (Thin Film Transistors) as driving elements and wiring which are electrically connected to the transparent pixel electrodes. The color filter is formed by arranging color filters for color-separating emergent light from the illuminating device 30 into, e.g., three primary colors, namely, red (R), green (G), and blue (B), respectively. The transparent electrode is made of, e.g., ITO (Indium Tin Oxide), and functions as a common counter electrode. Each alignment layer is made of, e.g., a polymeric material such as polyimide, and aligns liquid crystals. The liquid crystal layer is made of, e.g., liquid crystals of VA (Vertical Alignment) mode, TN (Twisted Nematic) mode, or STN (Super Twisted Nematic) mode, and has a function of transmitting or blocking the emergent light from the illuminating device 30 per pixel by a voltage applied from the driving circuit (not shown). Each transparent pixel electrode is made of, e.g., ITO, and functions as an electrode for each pixel.

The first polarizer 20A is a polarizer formed on a light incident side of the liquid crystal display panel 10, whereas the second polarizer 20B is a polarizer formed on a light emergent side of the liquid crystal display panel 10. The first polarizer 20A and the second polarizer 20B are a kind of optical shutter, and transmit therethrough only light (polarized light) in a specific direction of vibration. The first polarizer 20A and the second polarizer 20B are arranged such that their polarization axes differ 90 degrees from each other, so that the emergent light from the illuminating device 30 is transmitted or blocked via the liquid crystal layer.

The orientation of a polarization axis a of the first polarizer 20A is determined by a relationship as to which one is large or small between a refractive index of a brightness enhancement film 33 in an array direction in which later-described protrusions 33a are arrayed and a refractive index of the brightness enhancement film 33 in an extending direction in which each protrusion 33a extends. Specifically, the polarization axis a of the first polarizer 20A is oriented such that the refractive index of the brightness enhancement film 33 in a direction parallel to the polarization axis a becomes smaller than the refractive index of the brightness enhancement film 33 in a direction intersecting the polarization axis a.

For example, when the refractive index of the brightness enhancement film 33 in the array direction of the protrusions 33a is smaller than the refractive index of the brightness enhancement film 33 in the extending direction of the protrusions 33a, it is preferable that the polarization axis a of the first polarizer 20A be oriented in the array direction of the protrusions 33a as shown in FIG. 1. However, when the polarization axis a and the array direction of the protrusions 33a cannot be made identical for reasons, such as for obtaining a proper angular luminance distribution and for enhancing contrast of the liquid crystal display panel 10, an angle formed between the polarization axis a and the array direction of the protrusions 33a may be made greater. In this case, in order to enhance the front luminance, this angle may be greater than 0 degree and smaller than 45 degrees, or more preferably, greater than 0 degree and smaller than 20 degrees.

Meanwhile, when the refractive index of the brightness enhancement film 33 in the extending direction of the protrusions 33a is smaller than the refractive index of the brightness enhancement film 33 in the array direction of the protrusions 33a, it is preferable that the polarization axis a of the first polarizer 20A be oriented in the extending direction of the protrusions 33a. However, when the polarization axis a and the extending direction of the protrusions 33a cannot be made identical for reasons similar to the above, an angle formed between the polarization axis a and the extending direction of the protrusions 33a may be made greater. In this case, in order to enhance the front luminance, this angle may be greater than 0 degree and smaller than 45 degrees, or more preferably, greater than 0 degree and smaller than 20 degrees.

The illuminating device 30 has a light source 31, and has, e.g., a diffuser sheet 32 and the brightness enhancement film 33 (light-transmissive film) formed on a liquid crystal display panel 10 side of the light source 31, in order from the light source 31 side. On the other hand, a reflector sheet 34 is arranged behind the light source 31. In this way, in a present embodiment, the illuminating device 30 is of a so-called direct type, but may also be, e.g., of a side-edge type using a lightguide plate.

The light source 31 is constructed by parallely-arranging a plurality of linear light sources 31a at equal intervals (e.g., at intervals of 20 mm). The linear light source 31a includes, e.g., a HCFL (Hot Cathode Fluorescent Lamp), a CCFL (Cold Cathode Fluorescent Lamp), and the like. The light source 31 may be constructed by two-dimensionally arranging point light sources such as, e.g., LEDs (Light Emitting Diodes), or may be a surface light source such as organic EL (Electro Luminescence).

The reflector sheet 34 is, e.g., foam PET (Polyethylene Terephthalate), a silver-deposited film, a multilayer reflector film, or the like, and reflects part of emergent light from the light source 31 toward the liquid crystal display panel 10. As a result, the emergent light from the light source 31 can be utilized efficiently.

The diffuser sheet 32 is a diffuser plate formed by dispersing a diffusing material (filler) in a relatively thick plate-shaped transparent resin, a diffuser film formed by applying a transparent resin (binder) containing a diffusing material to a relatively thin film-shaped transparent resin, or a combination thereof. The plate-shaped or film-shaped transparent resin includes, for example, PET, acrylic, polycarbonate, and the like. The diffusing material includes, e.g., an inorganic filler such as $SiO_2$, an organic filler such as acrylic, and the like.

The brightness enhancement film 33 is made of, for example, a resin material having transmissivity, and is arranged such that a surface including the brightness enhancement film 33 extends parallel to a surface of the liquid crystal display panel 10. On a surface (front surface) on the light emergent side of this brightness enhancement film 33, a plurality of prismatic protrusions 33a extend in one direction in a plane parallel to the surface including the brightness enhancement film 33, as shown in FIG. 2A, and are also arranged parallel to succession in a direction intersecting their extending direction. Meanwhile, as shown in FIGS. 2A and 2B, on a surface (back surface) on the light incident side of this brightness enhancement film 33, a plurality of protrusions 33b extend and are arranged parallel to a predetermined direction in a plane parallel to the surface including the brightness enhancement film 33. Furthermore, the plurality of protrusions 33b are also arranged parallel in a direction intersecting the extending direction. Here, the extending direction of the protrusions 33a and the extending direction of the protrusions 33b may face the same direction each other, i.e., a shape-anisotropic axis of each protrusion 33a is preferably parallel to a shape-anisotropic axis of each protrusion 33b, but may also be oriented in directions different from each other. It is noted that FIG. 2A is a sectional view representing an example section of the brightness enhancement film 33 in an enlarged form, and that FIG. 2B is a plan view schematically representing the back surface of the brightness enhancement film 33.

(Protrusions 33a)

Each of the protrusions 33a is triangular prismatic in shape having an inclined faces 33d, 33e adjacent to a vertex 33c whose angle is θ1 as shown in, e.g., FIG. 2A, and these inclined faces 33d, 33e are arranged opposed obliquely at basic angles θ2, θ3 with respect to the surface including the brightness enhancement film 33, respectively. A width (pitch P1) as viewed in the array direction of the protrusion 33a is, e.g., not less than 10 μm and not more than 350 μm. The protrusion 33a is not limited to being triangular prismatic in shape such as shown in FIG. 2A, but may also be polyangular prismatic in shape such as, e.g., being pentangular prismatic, or may further have a curved shape (e.g., a cylindrical shape) such as an elliptic shape or an aspherical shape in a direction intersecting the extending direction of the protrusion 33a.

Furthermore, the protrusions 33a may not be identical in shape and size with each other. The protrusion 33a may have the following shape and size: (a) a cubic structure formed of a pair of identically shaped adjacent protrusions 33a in which one is high (large) and the other is low (small), is arranged side by side at equal pitches in the array direction; (b) a cubic structure formed of a pair of adjacent protrusions 33a having the same height but different shapes, is arranged side by side at equal pitches in the array direction; and (c) a cubic structure, formed of a pair of adjacent protrusions 33a having different sizes (heights) and shapes, is arranged side by side at equal pitches in the array direction. A plurality of protrusions and recesses may be disposed in the extending direction of each protrusion 33a.

As a result, each protrusion 33a refracts and transmits a component in the array direction, in a direction intersecting the liquid crystal display panel 10 of light incident from the back surface of the brightness enhancement film 33, to increase the directivity. A component of the extending direction of each protrusion 33a out of the light incident from the back surface of the brightness enhancement film 33 exhibits less refraction-operated converging effect in each of the protrusions 33a.

(Protrusions 33B)

As shown in FIGS. 2A and 2B, each of the protrusions 33b extends in a direction substantially parallel to the extending direction of protrusion 33a, and is prismatic in shape with the length in the extending direction shorter than a length in the extending direction of the protrusion 33a. Width (pitch P2) in a direction intersecting the extending direction of the protrusion 33b, width (pitch P3) in the extending direction of the protrusion 33b, shape of the protrusion 33b, the number of the protrusions 33b, haze value of the protrusion 33b, and the like are set properly depending on the intended use. However, the protrusions 33b need not be arranged regularly, but may be arranged randomly.

Each of the protrusions 33b may have a curved shape (e.g., a cylindrical shape) such as an elliptic shape or an aspherical shape in the direction intersecting the extending direction as shown in FIGS. 2A and 2B, or may also be polyangular prismatic in shape having at least one plane in the direction intersecting the extending direction. Furthermore, the protrusion 33b may also be, e.g., prismatic in shape extending in a direction intersecting the extending direction of the protrusions 33a.

Furthermore, each of the protrusions 33b may not be identical in shape and size with each other. The protrusions 33b may have the following shape and size: (a) a cubic structure formed of a pair of identically shaped adjacent protrusions 33b in which one is high (large) and the other is low (small), is arranged side by side at equal pitches in the direction intersecting the extending direction of each protrusion 33b; (b) a cubic structure formed of a pair of adjacent protrusions 33b having the same height but different shapes, is also be arranged side by side at equal pitches in the direction intersecting the extending direction of the protrusion 33b; (c) a cubic structure formed of a pair of adjacent protrusions 33b having different sizes (heights) and shapes, is arranged side by side at equal pitches in the direction intersecting the extending direction of the protrusion 33b. A plurality of protrusions and recesses may be disposed in the extending direction of each protrusion 33b.

As a result, each protrusion 33b refracts and transmit the a component in the direction intersecting the extending direction out of light incident from the back surface of the brightness enhancement film 33, in the direction parallel to the liquid crystal display panel 10, to decrease the directivity. It is noted that, a component in the extending direction of each protrusion 33b out of the light incident from the back surface of the brightness enhancement film 33, exhibit the less refraction-operated converging effect in the protrusion 33b. Namely, each protrusion 33b becomes anisotropic with respect to haze value due to the shape anisotropy.

The shape-anisotropic axis of each protrusion 33a and the shape-anisotropic axis of each protrusion 33b are preferably parallel to each other. For example, it is preferable that the extending direction of the protrusion 33a and the extending direction of the protrusion 33b be parallel to each other. In this case, a converging-effect-anisotropic axis of each protrusion 33a and a haze-value-anisotropic axis of each protrusion 33b are parallel to each other. As a result, compared with a brightness enhancement film 33 having no protrusions 33b on the back surface, a difference between the magnitude of a viewing angle in a horizontal direction and the magnitude of a viewing angle in a vertical direction, out of light having transmitted through the brightness enhancement film 33 is decreased.

In an embodiment, at least each protrusion 33a or each protrusion 33b has different refractive indices in the extending direction of the protrusion 33a and in the array direction of the protrusion 33a, respectively. However, if the protrusion 33a and the protrusion 33b each have different refractive indices in the extending direction of the protrusion 33a and in the array direction of the protrusion 33a, respectively, a relationship as to which one is large or small between a refractive index in the extending direction of the protrusion 33a in the protrusion 33a and a refractive index in the array direction of the protrusion 33a in the protrusion 33a equals a relationship as to which one is large or small between a refractive index in the extending direction of the protrusion 33a in the protrusion 33b and a refractive index in the array direction of the protrusion 33a in the protrusion 33b. Namely, at least each protrusion 33a or each protrusion 33b has refractive index anisotropy in a plane such that the refractive index in the direction parallel to the polarization axis a becomes smaller than the refractive index in the direction intersecting the polarization axis a.

In this way, in an embodiment, at least each protrusion 33a or each protrusion 33b has refractive index anisotropy in a plane such that the refractive index in the direction parallel to the polarization axis a is smaller than the refractive index in the direction intersecting the polarization axis a. As a result, light reflects more in the direction intersecting the polarization axis a, and by recycling the return light, light in the direction parallel to the polarization axis a can be increased. Accordingly, transmission characteristics of light incident on the brightness enhancement film 33 can be changed responsive to a state of polarization.

In an embodiment, it is possible to exhibit in-plane anisotropy of refractive index by stretching a sheet containing a semi-crystalline or crystalline resin in one direction. The semi-crystalline or crystalline resin includes a resin having a refractive index thereof in a stretching direction becomes greater than a refractive index thereof in a direction orthogonal to the stretching direction, a resin having a refractive index thereof in the stretching direction becomes smaller than a refractive index thereof in the direction orthogonal to the stretching direction, and the like. Materials exhibiting positive birefringence in which the refractive index in the stretching direction becomes great include, e.g., PET (Polyethylene Terephthalate), PEN (Polyethylene Naphthalate), and a mixture thereof, or a copolymer such as a PET-PEN copolymer, polycarbonate, polyvinyl alcohol, polyester, polyvinylidene fluoride, polypropylene, polyamide, and the like. Meanwhile, materials exhibiting negative birefringence in which the refractive index in the stretching direction becomes small include, e.g., a methacrylic resin, a polystyrene resin, a styrene-methyl methacrylate copolymer, a mixture thereof, and the like.

The in-plane anisotropy of refractive index may also be produced by using, e.g., a crystalline material having refractive index anisotropy. Furthermore, from the viewpoint of simplifying a manufacturing process, it would be preferable to form the brightness enhancement film 33 entirely from the same material. However, the protrusions 33a and the protrusions 33b alone may be made of the same material, or the protrusions 33a and the protrusions 33b may be made of different materials, respectively.

Next, a function of the brightness enhancement film 33 will be described in a case where the brightness enhancement film 33 exhibit, as a whole, different refractive indices in the extending direction of the protrusions 33a and in the array direction of the protrusions 33a, respectively.

FIG. 3 shows one example of an optical path formed when light from the illuminating device 30 enters from the back surface of the brightness enhancement film 33 in a case where the entire brightness enhancement film 33 is made of a material in which a refractive index nx in the extending direction of each protrusion 33a is greater (nx>ny) than a refractive index ny in the array direction of the protrusion 33a. It is noted that in FIG. 3, Lx denotes a polarized component oscillating in the extending direction (X direction) of the protrusion 33a, of the light from the illuminating device 30, and Ly denotes a polarized component oscillating in the array direction (Y direction) of the protrusion 33a, of the light from the illuminating device 30.

Light from the illuminating device 30 incident in an oblique direction with respect to the surface including the brightness enhancement film 33 exhibits different refractive indices (nx>ny in FIG. 3) in the extending direction of each protrusion 33a and in the array direction of the protrusion 33a, respectively. Accordingly, an X-direction polarized component Lx and a Y-direction polarized component Ly of the light from the illuminating device 30 refract at different refractive angles rx, ry (rx<ry in FIG. 3) at the back surface (light incident surface of each protrusion 33b) of the brightness enhancement film 33, and also emerge at different emergent angles φx, φy (φx>φy in FIG. 3) from the front surface (light emergent surface of each protrusion 33a) of the brightness enhancement film 33.

At this time, since the brightness enhancement film 33 has the different refractive indices (nx>ny in FIG. 3) in the extending direction of each protrusion 33a and in the array direction of the protrusion 33a, respectively, the polarized components oscillating in these directions are reflected at different reflectance at boundaries such as the light incident surface of the protrusion 33b and the light emergent surface of the protrusion 33a. Accordingly, as exemplified in FIG. 3, in a case (case A) where the refractive index nx in the extending direction of each protrusion 33a is greater than the refractive index ny in the array direction of the protrusion 33a in the brightness enhancement film 33 as a whole, Lx reflects more than Ly. As a result, in light having transmitted through the brightness enhancement film 33, a light amount of Ly becomes greater than a light amount of Lx. Conversely, in a case (case B) where the refractive index ny in the array direction of each protrusion 33a is greater than the refractive index nx in the extending direction of the protrusion 33a in the brightness enhancement film 33 as a whole, Ly reflects more than Lx. As a result, in the light having transmitted through the brightness enhancement film 33, the light amount of Lx becomes greater than the light amount of Ly.

Furthermore, since the brightness enhancement film 33 has the different refractive indices (nx>ny in FIG. 3) in the extending direction of each protrusion 33a and in the array direction of the protrusion 33a, respectively, the polarized components oscillating in these directions have different critical angles at boundaries such as the back surface of the brightness enhancement film 33 and the light incident surface of the protrusion 33a. Accordingly, in the case A, as exemplified in the middle of FIG. 3, when a light ray having entered at a certain incident angle approaches a light emergent surface at an angle greater than a critical angle of Lx and smaller than a critical angle of Ly, Lx totally reflects and Ly is transmitted. Hence, a complete polarized light-separated state can be provided in which the polarized component Lx repeats total reflection at the light emergent surface of each protrusion 33a to become return light, and only the polarized component Ly is transmitted through the light emergent surface of the protrusion 33a. Conversely, in the case B, when a light having entered at a certain incident angle approaches the light emergent surface at an angle greater than the critical angle of Ly and smaller than the critical angle of Lx, Ly totally reflects and Lx is transmitted. Accordingly, a complete polarized light-separated state can be provided in which the polarized component Ly repeats total reflection at the light emergent surface of each protrusion 33a to become return light, and only the polarized component Lx is transmitted through the light emergent surface of the protrusion 33a.

Furthermore, when the incident angle at which light from the illuminating device 30 enters the light emergent surface of each protrusion 33a becomes too large, the light from the illuminating device 30 repeats total reflection at the light emergent surface of the protrusion 33a to become return light to the illuminating device 30 in both cases A and B, irrespective of the state of polarization, as shown on the right side of FIG. 3.

As described above, when the brightness enhancement film 33 is imparted the in-plane refractive index anisotropy as a whole, it is possible to obtain, in addition to the converging effect for light from the illuminating device 30, a specific polarized light separation effect.

In an embodiment, in a case where a refractive-index-anisotropic axis of each protrusion 33a and a refractive-index-anisotropic axis of each protrusion 33b are parallel to each other, i.e., when a direction in which the refractive index is smallest in each protrusion 33a and a direction in which the refractive index is smallest in each protrusion 33b are parallel to each other, both the protrusion 33a and the protrusion 33b selectively transmit one of the polarized components (Ly in FIG. 3), and also selectively reflect the other polarized component (Lx in FIG. 3). Here, the light reflected at the light emergent surface of each protrusion 33a or at the light incident surface of each protrusion 33b is reflected at the reflector sheet 34 (FIG. 1) of the illuminating device 30 or at a front surface of the diffuser sheet 32 to be depolarized, and then the depolarized light enters the brightness enhancement film 33 again. As a result, it becomes possible to make the light amount of one (Ly in FIG. 3) of the polarized components significantly greater than the light amount of the other polarized component (Lx in FIG. 3), compared with a case where the direction in which the refractive index is smallest in each protrusion 33a and the direction in which the refractive index is smallest in each protrusion 33b intersect each other, or when either each protrusion 33a or each protrusion 33b has the polarized light separation effect. As a result, the light utilization efficiency is increased and the front luminance is enhanced.

It is noted that in the case where either each protrusion 33a or each protrusion 33b has the polarized light separation effect, the light utilization efficiency is lower than the case where both the protrusion 33a and the protrusion 33b have the polarized light separation effect, but their light utilization efficiency is higher than the case where neither the protrusion 33a nor the protrusion 33b has the polarized light separation effect, thereby enhancing the front luminance.

Furthermore, in a case where the shape-anisotropic axis (the extending direction) of each protrusion 33b and the refractive-index-anisotropic axis of the brightness enhancement film 33 are parallel to each other, the haze-value-anisotropic axis produced due to the shape anisotropy of each protrusion 33b becomes parallel to the refractive-index-anisotropic axis. As a result, when light incident from the back surface of the brightness enhancement film 33 is polarized and separated by the brightness enhancement film 33, light resulting from the polarization and separation emerges from the brightness enhancement film 33 without being depolarized. Consequently, by properly adjusting the magnitude of the haze value, amounts in which the front luminance that increases due to the refractive index anisotropy of the brightness enhancement film 33 is decreased by a diffusion effect of each protrusion 33b can be minimized.

Figure 4A:
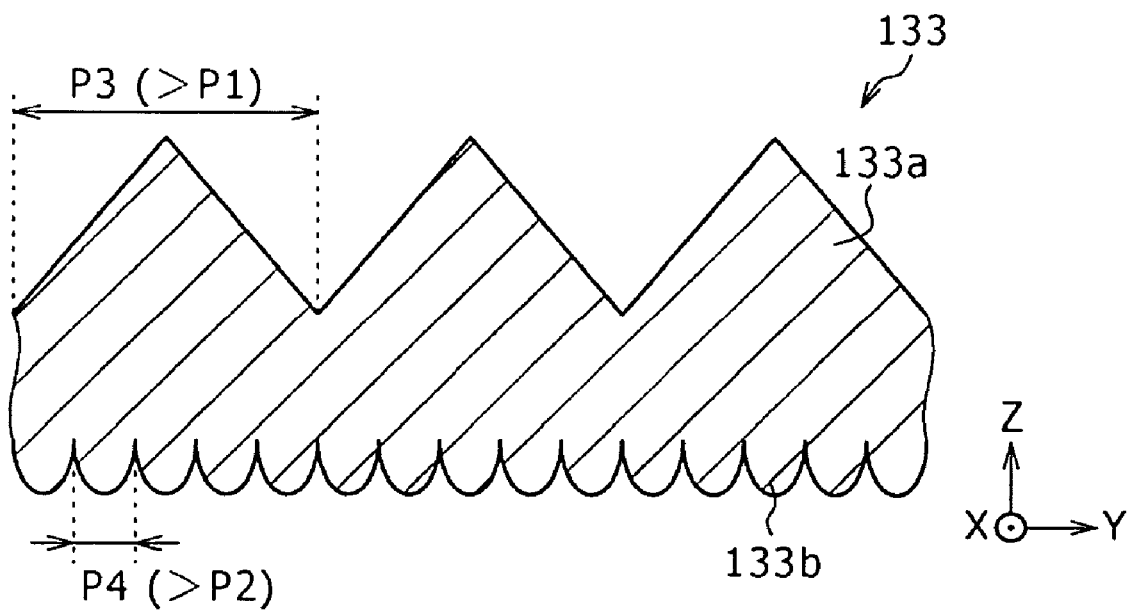
FIGS. 4A and 4B are a sectional view and a back view for illustrating an example of a formation method for the brightness enhancement film of FIG. 1.
Figure 4B:
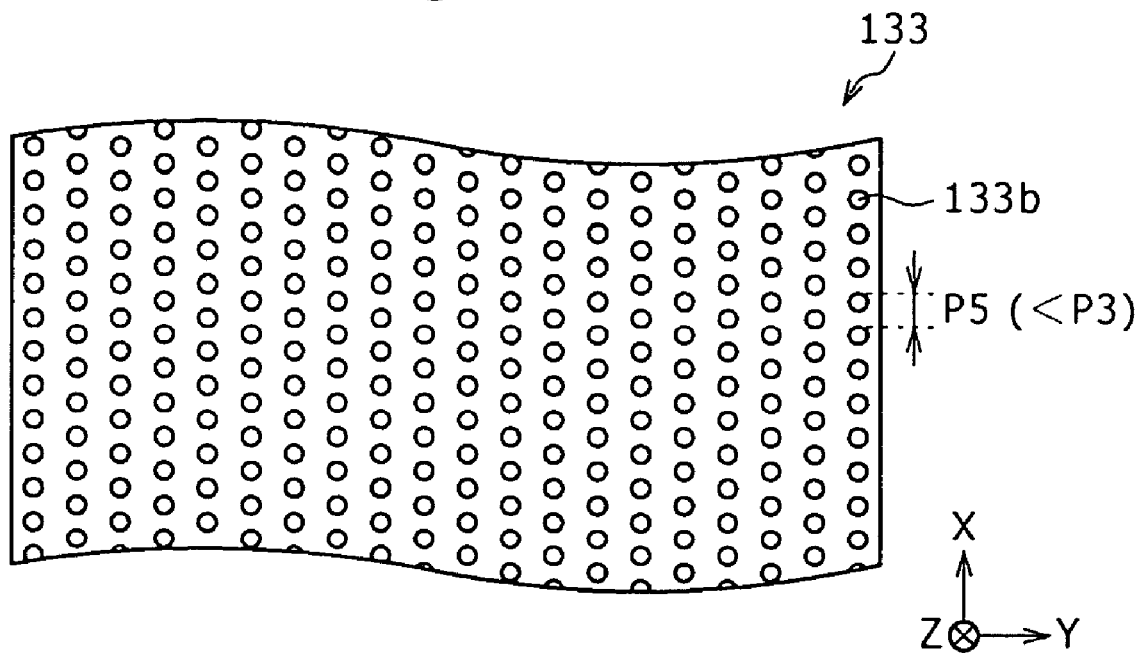
Figure 5A:
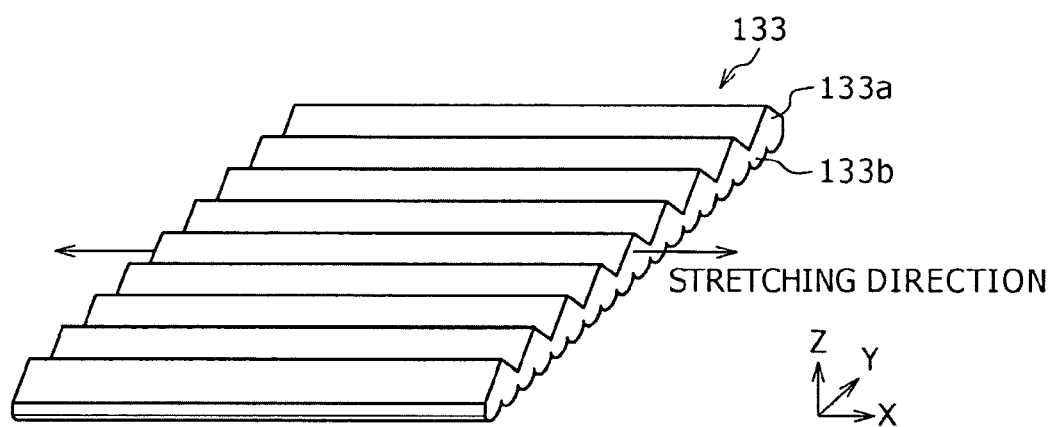
FIGS. 5A to 5C are a perspective view and sectional views for illustrating a process step following FIGS. 4A and 4B.
Figure 5B:
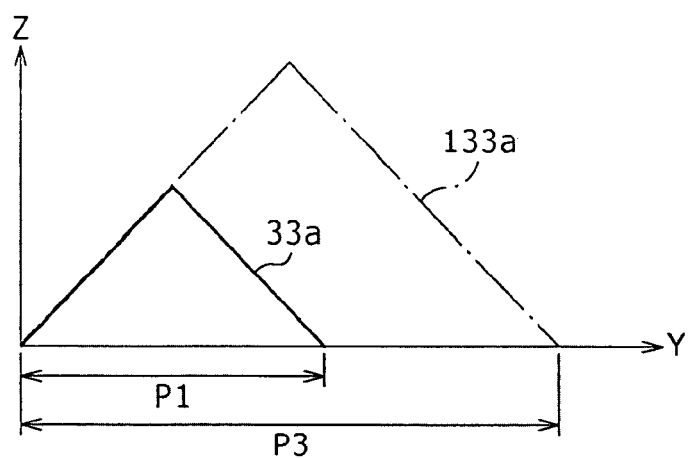
Figure 5C:
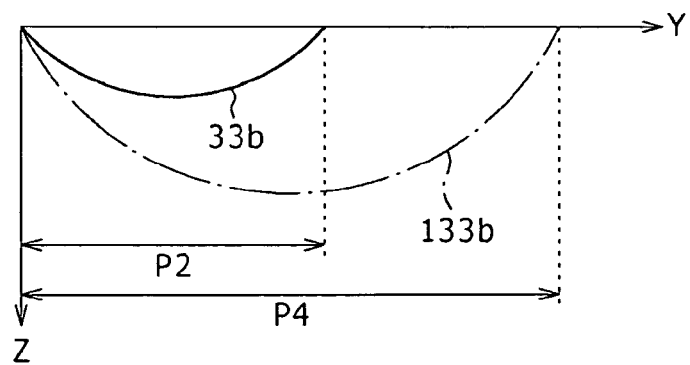

Referring next to FIGS. 4A, 4B, and 5A to 5C, an example of a formation method for the brightness enhancement film 33 according to an embodiment will be described. FIG. 4A is a sectional view of a configuration of a later-described brightness enhancement film 133, and that FIG. 4B is a plan view of a back surface of the brightness enhancement film 133. FIG. 5A is a perspective view of the brightness enhancement film 133, FIG. 5B is a sectional view of a protrusion 33a and a protrusion 133a, and FIG. 5C is a sectional view of a protrusion 33b and a protrusion 133b.

First, a plurality of protrusions 133a are formed at a pitch P3 (>P1) on one surface (front surface) of a resin film, and also a plurality of protrusions 133b are formed on a surface (back surface) opposite to the one surface of the resin film at a pitch P4 (>P2) in a direction intersecting an extending direction of the protrusions 133a, and at a pitch P5 (<P3) in the extending direction of the protrusions 133a (FIGS. 4A, 4B). As a result, the brightness enhancement film 133 having a plurality of protrusions 133a on the front surface and a plurality of protrusions 133b on the back surface is formed.

The brightness enhancement film 133 may be formed by, e.g., a heat pressing method, a fusion extruding method, or the like. Alternatively, the brightness enhancement film 133 can be formed by using a flat resin sheet as a base, and by bonding the plurality of protrusions 133a onto a front surface of this resin sheet, and further by bonding the plurality of protrusions 133b onto a back surface of the resin sheet. Still alternatively, the brightness enhancement film 133 may be formed by forming the protrusions 133a and the protrusions 133b on front surfaces of separate resin films, respectively, and then by bonding back surfaces of these resin films together.

Then, the brightness enhancement film 133 is stretched in the extending direction of the protrusions 133a (FIG. 5A). As a result, the protrusions 133a and the protrusions 133b are stretched in the stretching direction to become the protrusions 33a and the protrusions 33b. As a result, the extending directions of the protrusions 33a and the protrusions 33b are made identical with each other. Here, when the protrusions 133a and the protrusions 133b contain a semi-crystalline or crystalline resin, the protrusions 33a and the protrusions 33b become anisotropic with respect to refractive index due to the stretching. Namely, a single stretching process imparts both the protrusions 33a and the protrusions 33b anisotropy with respect to shape and refractive index. The refractive index anisotropy has an axis in a direction parallel or intersecting the extending direction.

In this case, as shown in FIG. 5B, the pitch P1 for the protrusion 33a becomes smaller than the pitch P3 for the protrusion 133a, and also the pitch P2 for the protrusion 33b becomes smaller than the pitch P4 for the protrusion 133b. Furthermore, the pitch P3 for the protrusion 33b becomes greater than the pitch P5 for the protrusion 133b. However, a sectional shape of the protrusion 33a in a direction intersecting the stretching direction is similar to a sectional shape of the protrusion 133a before the stretching, and also a sectional shape of the protrusion 33b in the direction intersecting the stretching direction is similar to a sectional shape of the protrusion 133b before the stretching. Namely, in a case where the brightness enhancement film 133 is stretched in the extending direction of the protrusions 133a, the brightness enhancement film 33 after the stretching has optical characteristics derived from the sectional shape in the direction intersecting the stretching direction changed little. As a result, the shape of the brightness enhancement film 33 after the stretching can be controlled highly accurately.

It is noted that when the protrusions 133a and the protrusions 133b are made of a common material, the refractive-index-anisotropic axis of each protrusion 33a and the refractive-index-anisotropic axis of each protrusion 33b are oriented in the same direction. Namely, the relationship as to which one is large or small between the refractive index in the extending direction of the protrusion 33a in the protrusion 33a and the refractive index in the array direction of the protrusion 33a in the protrusion 33a equals the relationship as to which one is large or small between the refractive index in the extending direction of the protrusion 33a in the protrusion 33b and the refractive index in the array direction of the protrusion 33a in the protrusion 33b.

The brightness enhancement film 33 may be formed by, e.g., a method as described below.

Figure 6A:
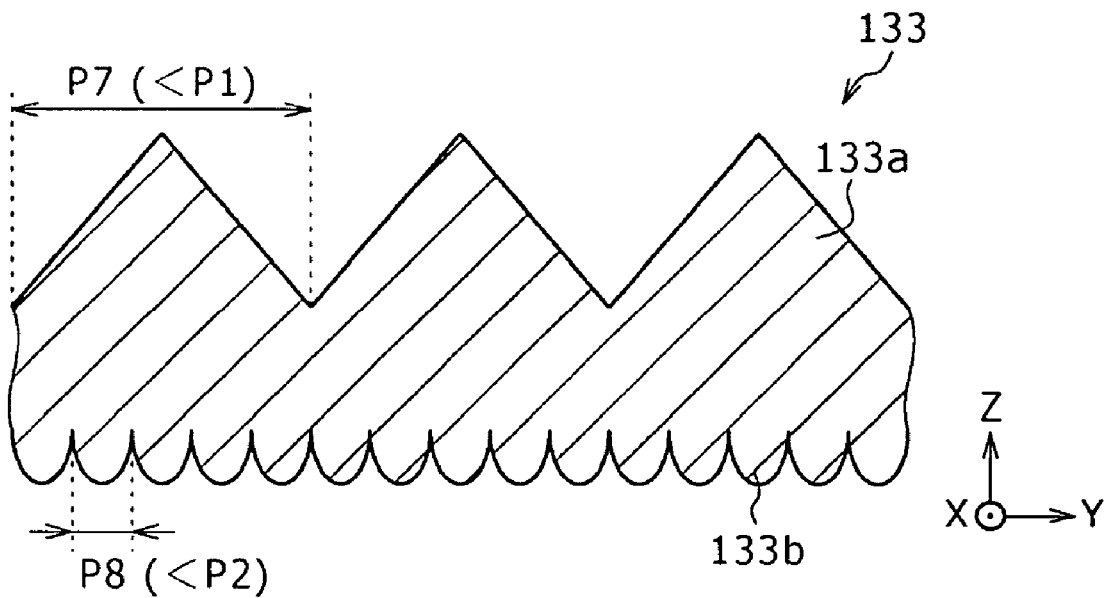
FIGS. 6A and 6B are a sectional view and a back view for illustrating another example of the method for manufacturing the brightness enhancement film of FIG. 1.
Figure 6B:
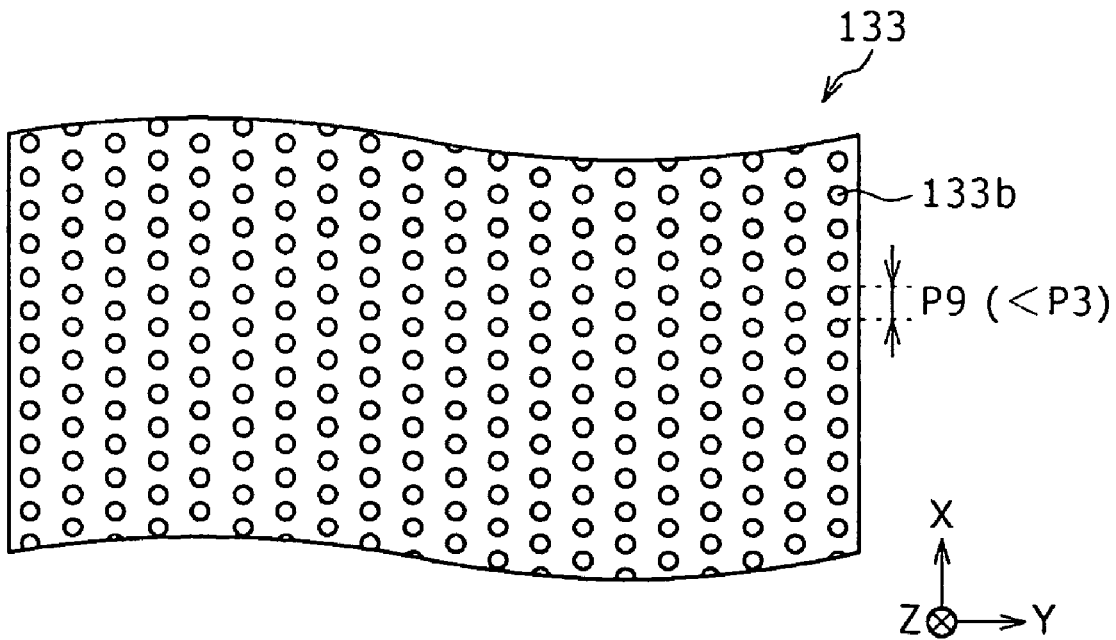
Figure 7A:
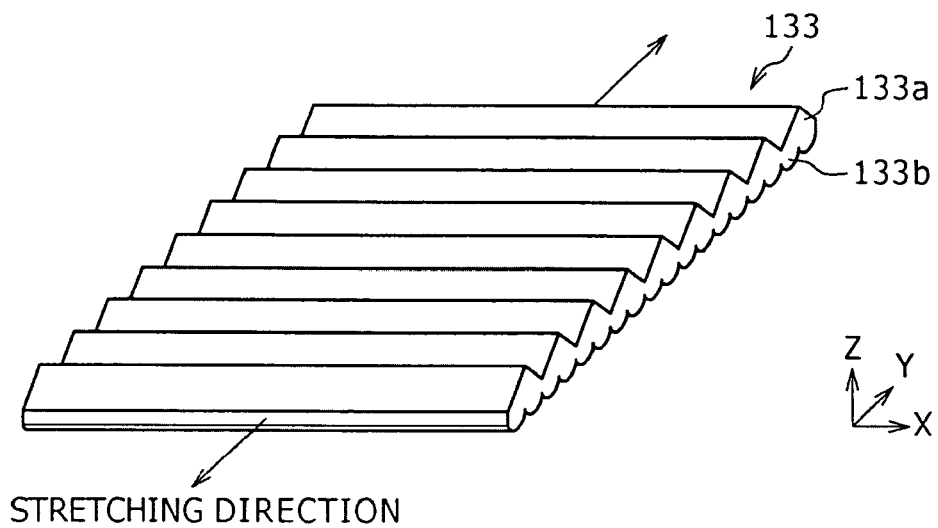
FIGS. 7A to 7C are a perspective view and sectional views for illustrating a process step following FIGS. 6A and 6B.

FIG. 6A is a sectional view of a configuration of the brightness enhancement film 133, and FIG. 6B is a plan view of the back surface of the brightness enhancement film 133. FIG. 7A is a perspective view of the brightness enhancement film 133, FIG. 7B is a sectional view of the protrusion 33a and the protrusion 133a, and FIG. 7C is a sectional view of the protrusion 33b and the protrusion 133b.

First, the plurality of protrusions 133a are formed at a pitch P7 (<P1) on one surface (front surface) of a resin film, and also the plurality of protrusions 133b are formed on a surface (back surface) opposite to the one surface of the resin film at a pitch P8 (<P2) in a direction intersecting an extending direction of the protrusions 133a, and at a pitch P9 (=3P) in the extending direction of the protrusions 133a (FIGS. 6A, 6B). As a result, the brightness enhancement film 133 is formed which has the plurality of protrusions 133a on the front surface and the plurality of protrusions 133b on the back surface. Even in this case, the brightness enhancement film 133 may be formed by using a method similar to the method described above.

Then, the brightness enhancement film 133 is stretched in a direction intersecting (orthogonal to) the extending direction of the protrusions 133a (FIG. 7A). As a result, the protrusions 133a and the protrusions 133b are made anisotropic with respect to refractive index, and thus the protrusions 33a and the protrusions 33b having refractive index anisotropy are formed.

Figure 7B:
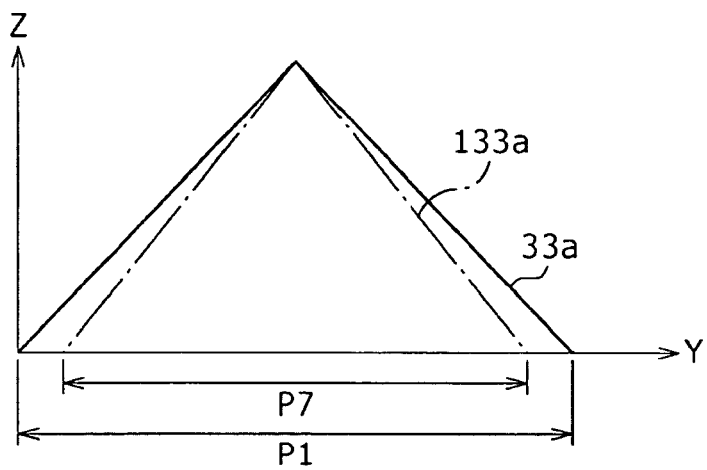
Figure 7C:
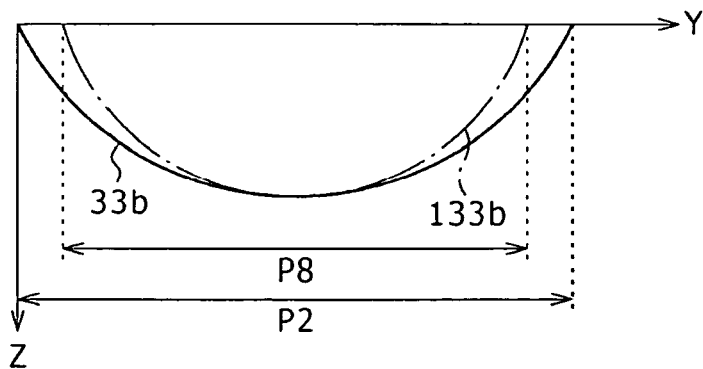

At this time, as shown in FIG. 7B, the pitch P1 for the protrusion 33a becomes larger than the pitch P7 for the protrusion 133a, and also the pitch P2 for the protrusion 33b becomes larger than the pitch P8 for the protrusion 133b. It is noted that the pitch P3 for the protrusion 33b is substantially the same as the pitch P9 for the protrusion 133b. Accordingly, a sectional shape of the protrusion 33a is a shape obtained by stretching a sectional shape of the protrusion 133a in the stretching direction (array direction), and a sectional shape of the protrusion 33b is also a shape obtained by stretching a sectional shape of the protrusion 133b in the stretching direction (array direction). Namely, when the stretching is performed in the extending direction of the protrusion 133a, it is understood that optical characteristics of the brightness enhancement film 133 before the stretching slightly change from those of the brightness enhancement film 133 after the stretching. For this reason, in this case, it is necessary that the shape of the brightness enhancement film 133 before the stretching be formed, after predicting the shape of the brightness enhancement film 133 after the stretching.

In the above-mentioned methods, the protrusions 33a and the protrusions 33b are formed by stretching both the protrusions 133a and the protrusions 133b simultaneously. However, the protrusions 33a and the protrusions 33b may be formed by stretching the protrusions 133a and the protrusions 133b separately, as exemplified below.

Figure 8A:
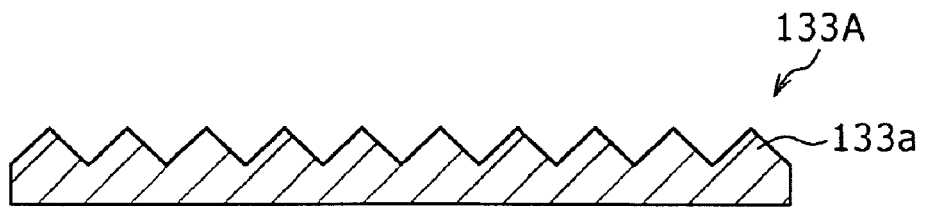
FIGS. 8A to 8E are sectional views for illustrating still another example of the method for manufacturing the brightness enhancement film of FIG. 1.
Figure 8B:
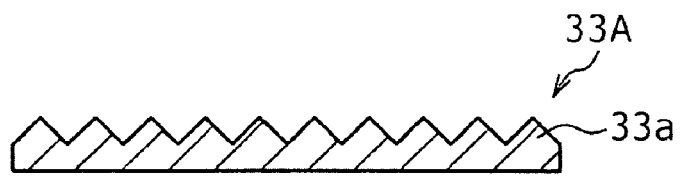
Figure 8C:
Figure 8D:
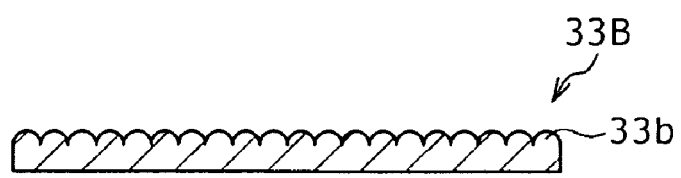

First, as shown in FIGS. 8A and 8B, the plurality of protrusions 133a are formed on one surface of a first resin film 133A, after which the protrusions 133a are stretched in a predetermined direction (the extending direction of the protrusions 133a in FIG. 8B). As a result, a first resin film 33A having the plurality of protrusions 33a is formed. Similarly, as shown in FIGS. 8C and 8D, the plurality of protrusions 133b are formed on one surface of a second resin film 133B, after which the protrusions 133b are stretched in a predetermined direction (the extending direction of the protrusions 133a in FIG. 8D). As a result, a second resin film 33B having the plurality of protrusions 33b is formed. The protrusions 133a may be formed on the first resin film 133A and the protrusions 133b can be formed on the second resin film 133B by using a method similar to the above-mentioned formation methods for the brightness enhancement film 133.

Figure 8E:
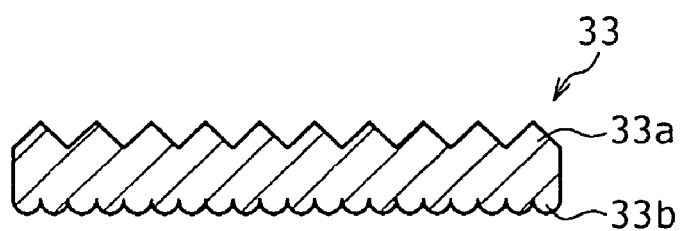

Then, as shown in FIG. 8E, a surface (back surface) opposite to the one surface of the first resin film 33A after the stretching and a surface (back surface) opposite to the one surface of the second resin film 33B after the stretching are bonded together. The brightness enhancement film 33 according to an embodiment may also be formed in this way.

In a case where at least the protrusions 133a or the protrusions 133b are made of a crystalline material having refractive index anisotropy, the protrusions made of the crystalline material having refractive index anisotropy inherently have refractive index anisotropy in a plane without specially being stretched. Accordingly, in this case, the back surface of the resin film having the protrusions made of the refractive-index-anisotropic crystalline material may be bonded to the back surface of a mating resin film, without being stretched.

Furthermore, it is possible to impart refractive index anisotropy only to the protrusions 33a or the protrusions 33b by using a method described below.

Figure 9A:
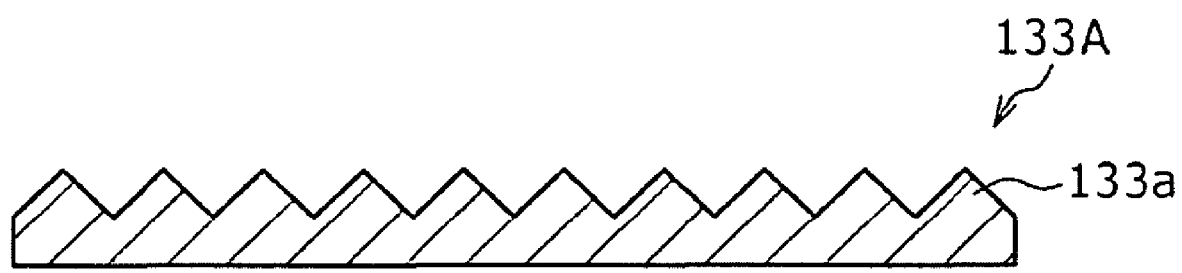
FIGS. 9A to 9C are sectional views for illustrating still another example of the method for manufacturing the brightness enhancement film of FIG. 1.
Figure 9B:
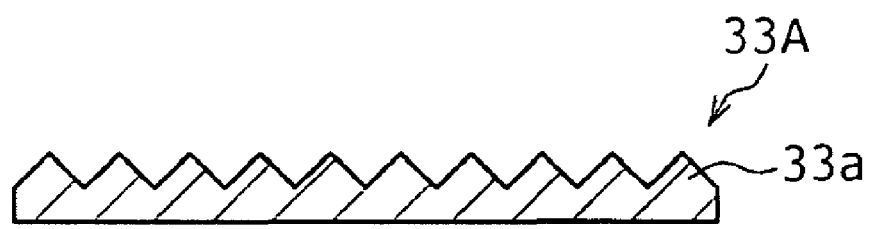
Figure 9C:
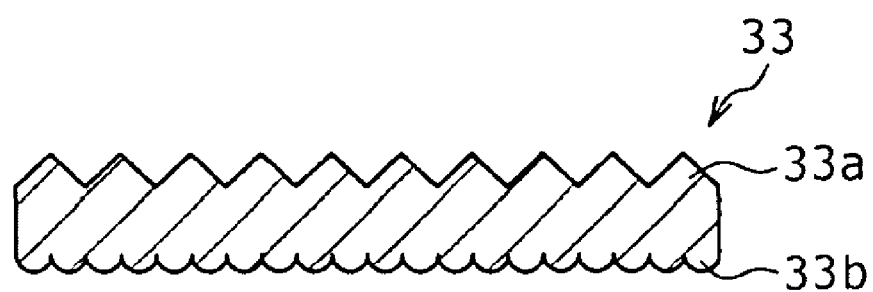

First, as shown in FIGS. 9A and 9B, a plurality of protrusions 133a are formed on one surface of the first resin film 133A, after which the protrusions 133a are stretched in a predetermined direction. As a result, the first resin film 33A having the plurality of protrusions 33a is formed. Then, a plurality of protrusions 33b are formed on a surface (back surface) opposite to the one surface of the first resin film 33A after the stretching. The brightness enhancement film 33 according to an embodiment may also be formed in this way. The protrusions 133a may be formed on the first resin film 133A and the protrusions 33b may be formed on the first resin film 33A also by using a method similar to the above-described methods of forming the brightness enhancement film 133.

Referring next to FIG. 10, a basic operation for displaying an image on the display apparatus 1 according to an embodiment will be described. It is noted that FIG. 10 represents one example of the basic operation of the display apparatus 1 schematically.

Unpolarized light L emitted from the illuminating device 30 and transmitting through the diffuser sheet 32 enters the back surface of the brightness enhancement film 33. The light L is diffused at the protrusions 33b and also has the directivity increased at the protrusions 33a. Furthermore, at this time, the light L is also separated into a polarized component (Ly in FIG. 10) parallel to the polarization axis a of the first polarizer 20A by an operation of at least the protrusions 33a or the protrusions 33b, and the resultant light enters the first polarizer 20A.

Of the light having entered the first polarizer 20A, a polarized component (Lx in FIG. 10) intersecting the polarization axis a is absorbed by the first polarizer 20A, whereas the polarized component (Ly in FIG. 10) parallel to the polarization axis a is transmitted through the first polarizer 20A. The light component Ly having transmitted through the first polarizer 20A is polarization-controlled in units of pixels by the liquid crystal display panel 10 and enters the second polarizer 20B, where only polarized light along a polarization axis b of the second polarizer 20B is transmitted to form an image on the front surface of the panel. The image is displayed on the display apparatus 1 in this way.

By the way, in an embodiment, at least the protrusions 33a or the protrusions 33b of the brightness enhancement film 33 have such refractive index anisotropy in a plane that the refractive index in the direction parallel to the polarization axis a becomes smaller than the refractive index in the direction intersecting the polarization axis a. As a result, out of the light L incident on the back surface of the brightness enhancement film 33, the polarized component (Lx in FIG. 10) intersecting the polarization axis a is reflected at the brightness enhancement film 33, and the reflected light is reflected at the front surface of the diffuser sheet 32, or at the reflector sheet 34 of the illuminating device 30 to become depolarized light, and then the depolarized light enters the brightness enhancement film 33 again. By repeating such a light reflection and a light incidence, the extraction efficiency of the light L is increased, and hence enhancement of the front luminance can be achieved.

Furthermore, in an embodiment, when the shape-anisotropic axis (extending direction) of each protrusion 33b and the refractive-index-anisotropic axis of the brightness enhancement film 33 are parallel to each other, the anisotropic axis of haze caused by the shape anisotropy of each protrusion 33b extends parallel to the refractive-index-anisotropic axis. As a result, when light incident from the back surface of the brightness enhancement film 33 is separated by polarization by the brightness enhancement film 33, light after the separation by polarization emerges from the brightness enhancement film 33 without being depolarized. As a result, by properly adjusting the magnitude of the haze value, amounts in which the front luminance that increases due to the refractive index anisotropy of the brightness enhancement film 33 is decreased by the diffusion effect of each protrusion 33b can be minimized.

Furthermore, in an embodiment, a plurality of protrusions 33b are formed on the back surface of the brightness enhancement film 33. Thus, when the light-transmissive film flexes due to the influence of heat or the like, there is no likelihood that the back surface will be stuck to a member (e.g., the diffuser sheet 32) disposed on the back surface side. As a result, the possibility can be avoided that the optical defects (non-uniformity due to interference) called "Newton's rings" or "wet-out" will occur. Furthermore, by utilizing the diffusion effect of the protrusions 33b, it is possible to control incident light so as not to converge intensively at the front. Thus, the possibility can be avoided that the abrupt reduction in the viewing angle dependence of brightness called dark band or cut-off will occur.

Accordingly, in an embodiment, the non-uniformity due to interference and the abrupt reduction in the viewing angle dependence of brightness can be decreased without reducing the front luminance.

EXAMPLES

Next, an example of the brightness enhancement film 33 according to the above embodiment will be described in comparison with comparative examples 1 to 3. First, method for forming brightness enhancement films according to the example and the comparative examples 1 to 3, and features (similarity in sectional shape, shape anisotropy, haze value anisotropy, and birefringence) of light-transmissive films according to the example and the comparative examples 1 to 3 will be described.

[Method for Forming Brightness Enhancement Films According to Examples and Comparative Examples 1 to 3]

A metal emboss master to be heat-pressed was prepared for transferring the protrusions 133a onto a resin film. A protrusion/depression pattern was carved on a surface of the master, in which right-angled isosceles triangular prisms each having a vertical angle of 90 degrees and basic angles of 45 degrees were arranged parallel to succession at a pitch of 50 μm. Furthermore, a metal protrusions master to be heat-pressed was prepared for transferring the protrusions 133b onto the resin film. A protrusion/depression pattern was formed on a surface of this master, which were sand-blast such that Sra is 2 μm and haze values range from 50 to 60%. As the resin film, a 200 μm-thick A-PEN (Amorphous PEN) sheet (at Tg of about 120° C.) was used. A-PEN is a material that becomes anisotropic with respect to refractive index when stretched such that a refractive index in a stretching direction becomes greater than a refractive index in a direction intersecting the stretching direction, and A-PEN itself does not have refractive index anisotropy.

The resin film was sandwiched between the metal emboss master and the metal protrusions master, pressed under heat pressing conditions of 150° C., 10 minutes, and 100 kgf/cm² (9.8 MPa). Then, the resultant film was abruptly charged into ice water and hardened, to transfer and form the protrusions 133a on a front surface of the resin film and also the protrusions 133b on a back surface of the resin film. How the back surface of the resin film looked on which the protrusions 133b were transferred and formed is shown in FIG. 11A. The brightness enhancement film 133 obtained by the processes as described above was not stretched during the manufacturing process, and thus did not have refractive index anisotropy. It is noted that this brightness enhancement film 133 was used as a light-transmissive film as the comparative example 3.

Then, this brightness enhancement film 133 was cut into a rectangle 8 cm long (the extending direction of the protrusions 133a) and 5 cm wide (the direction intersecting the extending direction of the protrusions 133a). Then, with both ends in a longitudinal direction of the rectangle was chucked by a manual stretching machine, the brightness enhancement film 133 was uniaxially stretched in the longitudinal direction at a stretching speed of 1 cm/second at 140° C. such that a midsection of the brightness enhancement film 133 is stretched to a length 3.5 times, to stretch the protrusions 133a and the protrusions 133b in the longitudinal direction. Thus, the protrusions 33a and the protrusions 33b having refractive index anisotropy were formed. The brightness enhancement film 33 obtained in this way was used as a light-transmissive film as tan example. How the back surface of the brightness enhancement film 33 looked on which the protrusions 33b were formed is shown in FIG. 1B.

Furthermore, the resin film was sandwiched between the metal emboss master and a metal plane master, and pressed under heat pressing conditions of 150° C., 10 minutes, and 100 kgf/cm² (9.8 MPa). Then, the resultant resin film was abruptly charged into ice water and hardened, to transfer and form the protrusions 133a on a front surface of the resin film. The first resin film 133A obtained in this way was not stretched during the manufacturing process, and thus did not have refractive index anisotropy. It is noted that this first resin film 133A was used as a light-transmissive film as the comparative example 1.

Then, this first resin film 133A was cut into a rectangle 8 cm long (the extending direction of the protrusions 133a) and 5 cm wide (the direction intersecting the extending direction of the protrusions 133a). Then, with both ends in a longitudinal direction of the rectangle chucked by the manual stretching machine, the first resin film 133A was uniaxially stretched in the longitudinal direction at a stretching speed of 1 cm/second at 140° C. such that a midsection of the first resin film 133A was stretched to a length 3.5 times. As a result, the protrusions 133a were stretched to form the protrusions 33a having refractive index anisotropy. The thus obtained first resin film 33A was used as a light-transmissive film as the comparative example 2.

[Similarity in Sectional Shape]

Sections in the array direction of the various types of light-transmissive films obtained in this way were measured using a surface roughness meter (SURFCORDER ET4001A manufactured by Kosaka Laboratory, Ltd.). As a result, the light-transmissive film as the example and the light-transmissive films as the comparative examples 1 to 3 each had a right-angled isosceles triangular section having a vertical angle of 90 degrees and basic angles of 45 degrees, which is identical with the protrusion/depression pattern of the metal emboss master, and thus were similar in shape. Furthermore, the protrusions 133a of the light-transmissive films before the stretching (the light-transmissive films as the comparative examples 1 and 3) extended at a pitch of about 50 µm, which is the same as in the master, whereas the protrusions 33a of the light-transmissive films after the stretching (the light-transmissive films as the comparative example 2 and the example) extended at a pitch of about 26.8 µm, which is a narrower value.

[Shape Anisotropy]

Furthermore, the back surfaces of the light-transmissive film as the example and the light-transmissive film as the comparative example 3 which were obtained as described above were measured using the surface roughness meter (SURFCORDER ET4001A manufactured by Kosaka Laboratory, Ltd.). As a result, when the protrusions 133b of the light-transmissive film before the stretching (the light-transmissive film in the comparative example 3) were compared with the protrusions 33b of the light-transmissive film after the stretching (the light-transmissive film in the example), the protrusions 33b had a shape obtained by stretching the protrusions 133b.

[Haze Value Anisotropy]

Furthermore, polarization axis-based differences in the haze value between the light-transmissive film (the light-transmissive film as the comparative example 2) having no protrusions 33b and the light-transmissive film (the light-transmissive film as the example) having the protrusions 33b were measured using Hazemeter HM-150 (manufactured by Murakami Color Research Laboratory). As a result, as shown in FIG. 12, the light-transmissive film as the comparative example 2 did not exhibit haze value anisotropy, whereas the light-transmissive film as the example exhibited haze value anisotropy.

[Birefringence]

Figure 13:
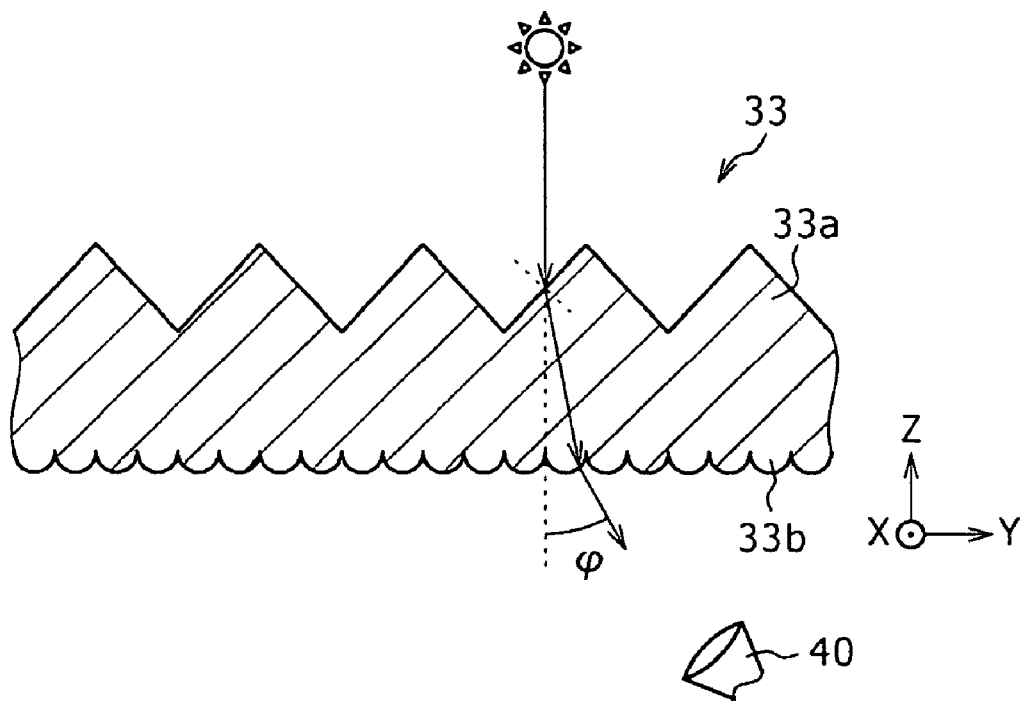
FIG. 13 is a conceptual diagram for illustrating an example of a method for measuring birefringence.
Figure 14:
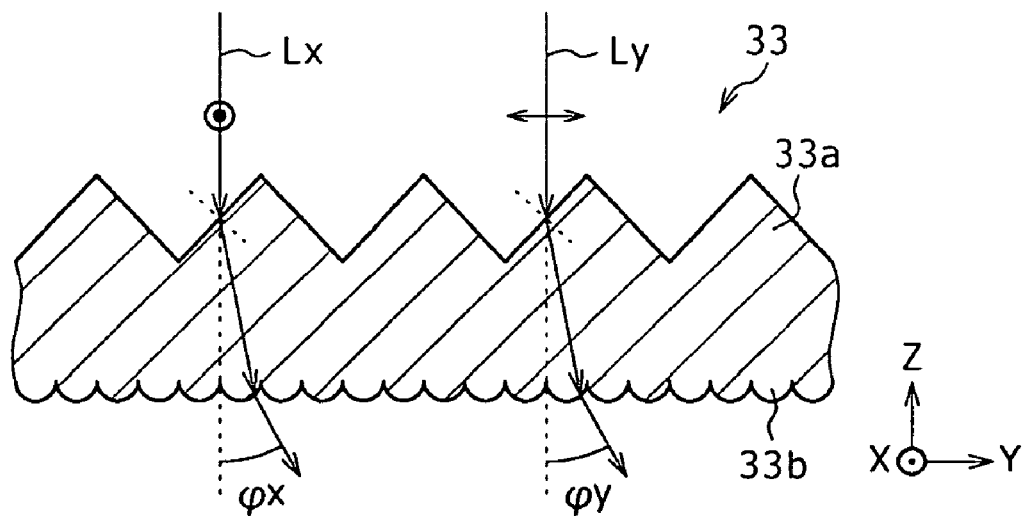
FIG. 14 is a conceptual diagram for illustrating polarization axes exhibiting birefringence.
Figure 15:
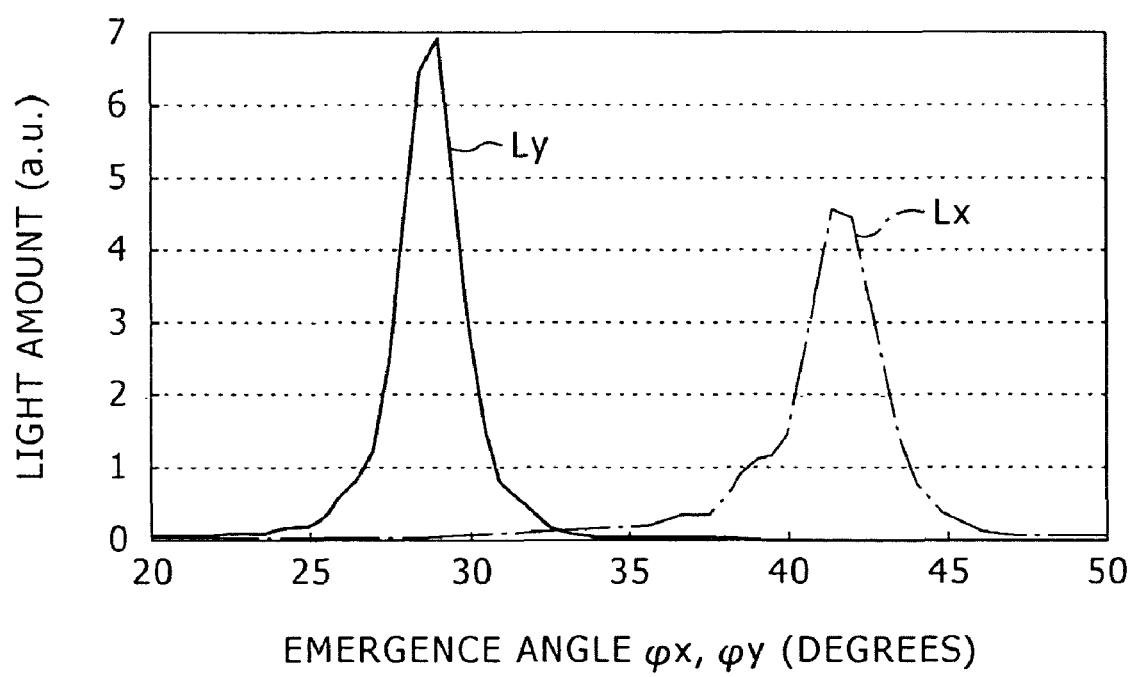
FIG. 15 is a relational diagram representing a relation between emergent angle and light amount in the brightness enhancement film according to an embodiment.

Next, the birefringence of the light-transmissive film as the example obtained as described above was measured. As shown in FIG. 13, for measuring the birefringence, polarized light incident vertically from the protrusions 33a of the brightness enhancement film 33, and the transmitted light was detected by a measuring device 40. On the basis of differing emergent angles φ of the transmitted light, a difference Δn (=nx−ny) between the refractive index nx in the extending direction of the protrusions 33a and the refractive index ny in their array direction was calculated. It is noted that, as shown in FIG. 14, when the polarized component oscillating in the extending direction of the protrusions 33a is denoted vertically polarized light Lx, and the polarized component oscillating in the array direction of the protrusions 33a is denoted horizontally polarized light Ly, an emergent angle φx of the vertically polarized light Lx became greater than an emergent angle φy of the horizontally polarized light Ly, as shown in FIG. 15. It is also noted that a unit (a.u.) of the vertical axis of FIG. 15 means an arbitrary unit, and indicates that the value is a "relative value".

As a result of the measurement, the refractive index nx of the brightness enhancement film 33 in the extending direction was 1.79, whereas the refractive index ny in the array direction was 1.56. Hence, the difference Δn between the refractive indices was 0.23. Thus, an A-PEN sheet was heat-pressed to form the protrusions 33a and the protrusions 33b, and the resultant sheet was then uniaxially stretched, to obtain the light-transmissive film having different refractive indices in the extending direction of the protrusions 33a and in the array direction of the protrusions 33a, respectively. Furthermore, as shown in FIG. 15, it is found out that the horizontally polarized light Ly has a higher transmissivity than the vertically polarized light Lx. This is because the total reflection effect of the polarized component Lx parallel to the extending direction of the protrusions 33a is increased at the light emergent surface of the protrusions 33a and at the light incident surface of the protrusions 33b, and thus the transmitted light amount of Lx is decreased compared with that of Ly, since the refractive index nx of the brightness enhancement film 33 in the extending direction of the protrusions 33a is greater than the refractive index ny of the brightness enhancement film 33 in the array direction of the protrusions 33a.

[Front Luminance, Illuminance, Alignment Luminance, Viewing Angle, Cut-Off, and Non-Uniformity Due to Interference]

Figures 16, 17:
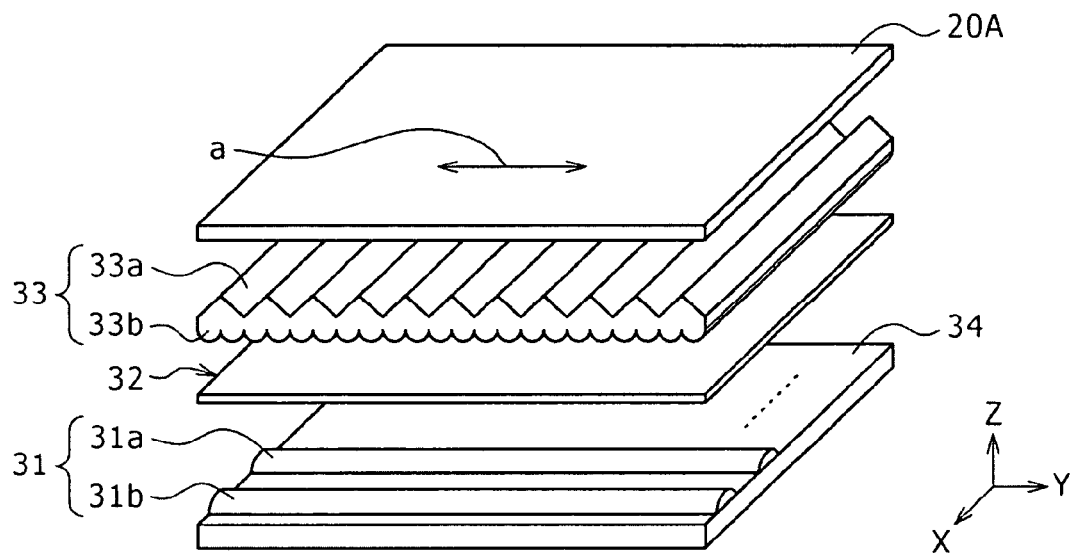
FIG. 16 is a perspective view for illustrating a configuration for measuring front luminance and the like of brightness enhancement films according to examples and comparative examples.
FIG. 17 is a comparative diagram for illustrating the front luminance and the like of the brightness enhancement films according to examples and the comparative examples.

Then, front luminance, illuminances, alignment luminance, and viewing angles of the various light-transmissive films were measured, respectively. For example, as shown in FIG. 16, the diffuser sheet 32, the brightness enhancement film 33, and the first polarizer 20A were formed on the illuminating device 31, in order of mention from the illuminating device 31 side, and the reflector sheet 34 was arranged behind the illuminating device 31. Under this condition, the front luminance, illuminance, alignment luminance, and viewing angle of light emerging from the first polarizer 20A were measured using a luminance/color difference meter (EZ-contrast XL88 (manufactured by ELDIM)). It is noted that the front luminance, illuminance, alignment luminance, and viewing angle for the other light-transmissive films were measured by replacing the brightness enhancement film 33 in FIG. 16 with such other light-transmissive films. Furthermore, cut-off level and level of non-uniformity due to interference in the various light-transmissive films were judged visibly. The measured front luminance, illuminances, cut-off level and level of non-uniformity due to interference were shown in FIG. 17, the measured alignment luminance were shown in FIG. 18, and the measured viewing angles were shown in FIG. 19.

It is noted that, in FIG. 17, a cut-off level "OK" means a case where it is judged impossible or difficult to visibly identify an abrupt change in the viewing angle dependence of brightness, whereas a cut-off level "NG" means a case where it is judged possible or easy to visibly identify an abrupt change in the viewing angle dependence of brightness. Furthermore, a level of non-uniformity due to interference "OK" means a case where it is judged impossible or difficult to visibly identify the occurrence of non-uniformity due to interference, whereas a level of non-uniformity due to interference "NG" means a case where it is judged possible or easy to visibly identify the occurrence of non-uniformity due to interference. Furthermore, areas surrounded by large circles in FIG. 18 correspond to areas where cut-off is easy to occur, and visible inspections were performed to check whether or not cut-off has occurred in these areas.

Figures 18, 19:
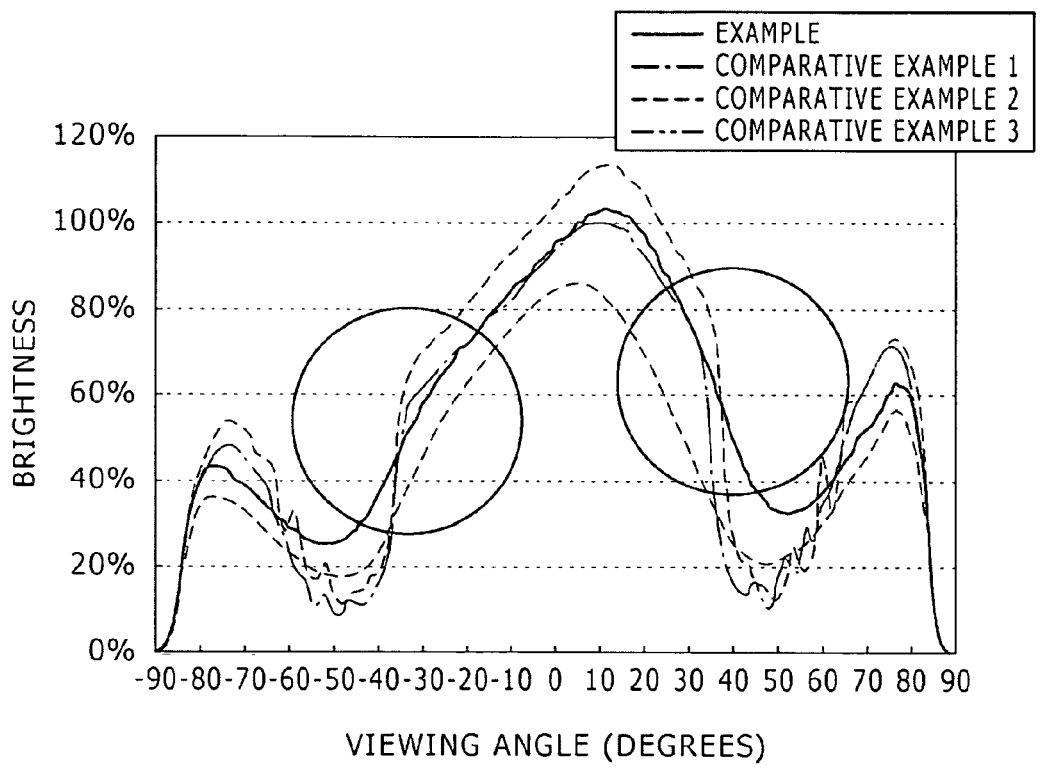
FIG. 18 is a relational diagram representing a relation between viewing angle and brightness in the brightness enhancement films according to examples and the comparative examples.
FIG. 19 is a comparative diagram for illustrating the viewing angles of the brightness enhancement films according to example and the comparative examples.

It is understood from FIGS. 17 and 18 that the light-transmissive film according to the example reduces or prevents the occurrence of cut-off and non-uniformity due to interference while keeping the front luminance higher, than the light-transmissive films as the comparative examples 1 and 3. Furthermore, it is understood from FIGS. 17 and 19 that the light-transmissive film according to the example keeps the horizontal and vertical viewing angles wider due to the diffusion effect of the protrusions 33b, while keeping the front luminance higher, than the light-transmissive film as the comparative example 1.

As described in the foregoing, the present application has been described with reference to the embodiment and the examples. The present application is not limited to such embodiment and the like, but may be modified in various ways.

For example, although only one sheet of brightness enhancement film 33 is used in the above-described embodiment and the like, two sheets of brightness enhancement film 33 may be stacked one upon another. In this case, it is desirable to arrange the protrusions 33a such that the extending directions of the protrusions 33a intersect orthogonally between the upper and lower sheets, and also to make, in one of the brightness enhancement films 33, the refractive index in the extending direction of the protrusions greater, and to make, in the other brightness enhancement film 33, the refractive index in the array direction of the protrusions 33a greater.

Furthermore, although the configuration of the liquid crystal display apparatus has been described by referring to a specific configuration in the above-described embodiment and the like, all the layers need not be disposed, and other layers may be disposed as well.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A light-transmissive film comprising:
   a plurality of first protrusions formed on one surface and extending in a predetermined direction of the one surface; and
   a plurality of second protrusions formed on an opposite surface to the one surface, extending in one direction of the opposite surface, arranged parallel to the one direction, and arranged parallel to a direction intersecting the one direction,
   wherein at least one of the first and second protrusions has a refractive index anisotropy in a plane, and
   wherein shapes of the second protrusions are different than shapes of the first protrusions.

2. The light-transmissive film according to claim 1, wherein the extending direction of the first protrusions and the extending direction of the second protrusions are parallel to each other.

3. The light-transmissive film according to claim 1, wherein each of the first protrusions has a prismatic shape.

4. The light-transmissive film according to claim 1, wherein the extending direction of the first protrusions has a refractive index greater than a refractive index in a direction intersecting the extending direction of the first protrusions.

5. The light-transmissive film according to claim 1, wherein the extending direction of the first protrusions has a refractive index smaller than a refractive index in a direction intersecting the extending direction of the first protrusions.

6. The light-transmissive film according to claim 1, wherein the extending direction of the second protrusions has a refractive index greater than a refractive index in a direction intersecting the extending direction of the second protrusions.

7. The light-transmissive film according to claim 1, wherein the extending direction of the second protrusions has a refractive index smaller than a refractive index in a direction intersecting the extending direction of the second protrusions.

8. The light-transmissive film according to claim 1, wherein the first protrusions and the second protrusions each have refractive index anisotropy in a plane.

9. The light-transmissive film according to claim 8, wherein a direction in which the refractive index is smallest in the first protrusions and a direction in which the refractive index is smallest in the second protrusions are parallel to each other.

10. The light-transmissive film according to claim 1, wherein at least one of the first and second protrusions is formed by being stretched in the extending direction of the first protrusions.

11. The light-transmissive film according to claim 1, wherein at least one of the first and second protrusions contains a semi-crystalline or crystalline resin.

12. The light-transmissive film according to claim 1, wherein:
   the first protrusions are formed on one surface of a first light-transmissive film;
   the second protrusions are formed on one surface of a second light-transmissive film; and
   an opposite surface to the one surface of the first light-transmissive film and an opposite surface to the one surface of the second light-transmissive film are bonded to each other.

13. The light-transmissive film according to claim 1, wherein each of the second protrusions has a curved shape.

14. The light-transmissive film according to claim 13, wherein each of the first protrusions has a prismatic shape.

15. The light-transmissive film according to claim 1, wherein the second protrusions have a shape selected from the group consisting of:
   a curved shape;
   a cylindrical shape;
   an elliptical shape having a major axis in the extending direction;
   an aspherical shape having a major dimension thereof in the extending direction; and
   a polyangular prismatic shape having at least one plane in the direction intersecting the extending direction.

16. The light-transmissive film according to claim 1, wherein the second protrusions have a shape of a cubic structure formed of a pair of identically shaped adjacent sub-protrusions in which one is higher and larger than the other, said second protrusions being arranged side by side at equal pitches in the direction intersecting the extending direction of the second protrusions.

17. The light-transmissive film according to claim 1, wherein the second protrusions have a shape a cubic structure formed of a pair of adjacent sub-protrusions having the same height but different shapes, said second protrusions being arranged side by side at equal pitches in the direction intersecting the extending direction of the second protrusions.

18. The light-transmissive film according to claim 1, wherein the second protrusions have a shape a cubic structure formed of a pair of adjacent sub-protrusions having different heights and shapes, said second protrusions being arranged side by side at equal pitches in the direction intersecting the extending direction of the second protrusions.

19. A display apparatus comprising:
    a panel driven in response to an image signal;
    a pair of polarizers sandwiching the panel therebetween;
    a light source for illuminating the panel; and
    a light-transmissive film disposed between the polarizers and the light source,
    wherein the light-transmissive film has:
    a plurality of first protrusions formed on one surface and extending in a predetermined direction of the one surface; and
    a plurality of second protrusions formed on an opposite surface to the one surface, extending in one direction of the opposite surface, arranged parallel to the one direction, and arranged parallel to a direction intersecting the one direction,
    wherein at least one of the first and second protrusions has a refractive index anisotropy in a plane, and
    wherein shapes of the second protrusions are different than shapes of the first protrusions.

20. The display apparatus according to claim 19, wherein:
    the first protrusions and the second protrusions each have refractive index anisotropy in a plane; and
    a direction in which a refractive index is smallest in the first protrusions and a direction in which a refractive index is smallest in the second protrusions are parallel to a direction of a light transmission axis of a polarizer on a side of the light source, or intersect at an angle not smaller than 0 degree and not greater than 45 degrees.

* * * * *